US012246753B2

(12) United States Patent
Khayatian et al.

(10) Patent No.: US 12,246,753 B2
(45) Date of Patent: Mar. 11, 2025

(54) SYSTEMS AND METHODS FOR COOPERATIVE DRIVING OF CONNECTED AUTONOMOUS VEHICLES IN SMART CITIES USING RESPONSIBILITY-SENSITIVE SAFETY RULES

(71) Applicant: Arizona Board of Regents on Behalf of Arizona State University, Tempe, AZ (US)

(72) Inventors: Mohammad Khayatian, Tempe, AZ (US); Mohammadreza Mehrabian, Tempe, AZ (US); Harshith Allamsetti, Milpitas, CA (US); Kai-Wei Liu, Taipei (TW); Po-Yu Huang, Taipei (TW); Chung-Wei Lin, Taipei (TW); Aviral Shrivastava, Phoenix, AZ (US)

(73) Assignees: Arizona Board of Regents on Behalf of Arizona State University, Tempe, AZ (US); National Taiwan University, Taipei (TW)

( * ) Notice: Subject to any disclaimer, the term of this patent is extended or adjusted under 35 U.S.C. 154(b) by 458 days.

(21) Appl. No.: 17/696,450

(22) Filed: Mar. 16, 2022

(65) Prior Publication Data
US 2022/0340177 A1    Oct. 27, 2022

Related U.S. Application Data

(60) Provisional application No. 63/177,107, filed on Apr. 20, 2021.

(51) Int. Cl.
*B60W 60/00* (2020.01)
*B60W 30/18* (2012.01)

(52) U.S. Cl.
CPC .......... *B60W 60/00272* (2020.02); *B60W 30/18109* (2013.01); *B60W 60/00274* (2020.02);
(Continued)

(58) Field of Classification Search
CPC ..... B60W 60/00272; B60W 30/18109; B60W 60/00274; B60W 2554/4041;
(Continued)

(56) References Cited

U.S. PATENT DOCUMENTS 10,906,558 B1 * 2/2021 Hwang ............ B60W 60/0027
11,747,806 B1 * 9/2023 Wootton ................ G08G 1/161
701/28
(Continued)

OTHER PUBLICATIONS

MG Mohanan and Ambuja Salgoankar. A survey of robotic motion planning in dynamic environments. Robotics and Autonomous Systems, 100:171-185, 2018.
(Continued)

*Primary Examiner* — Peter D Nolan
*Assistant Examiner* — Anwar Mohamed
(74) *Attorney, Agent, or Firm* — Polsinelli PC

(57) ABSTRACT

Various embodiments for systems and methods for cooperative driving of connected autonomous vehicles using responsibility-sensitive safety (RSS) rules are disclosed herein. The CAV system integrates proposed RSS rules with CAV's motion planning algorithm to enable cooperative driving of CAVs. The CAV system further integrates a deadlock detection and resolution system for resolving traffic deadlocks between CAVs. The CAV system reduces redundant calculation of dependency graphs.

21 Claims, 19 Drawing Sheets

(52) U.S. Cl.
CPC ............... *B60W 2554/4041* (2020.02); *B60W 2554/4049* (2020.02)

(58) Field of Classification Search
CPC ..... B60W 2554/4049; B60W 2556/65; B60W 30/0956; B60W 30/18154; B60W 30/08
See application file for complete search history.

(56) References Cited

U.S. PATENT DOCUMENTS

| | | | |
|---|---|---|---|
| 2019/0291728 A1* | 9/2019 | Shalev-Shwartz | B60W 50/082 |
| 2020/0062249 A1* | 2/2020 | Light | G08G 1/017 |
| 2021/0142421 A1* | 5/2021 | Shalev-Shwartz | G06Q 10/00 |
| 2021/0233396 A1* | 7/2021 | Guo | G08G 1/0133 |
| 2021/0300418 A1* | 9/2021 | Alvarez | G08G 1/096791 |
| 2022/0032960 A1* | 2/2022 | Wang | G05D 1/0088 |
| 2022/0234613 A1* | 7/2022 | Wenzel | B60W 50/14 |
| 2022/0289244 A1* | 9/2022 | Wang | B60W 60/0027 |

OTHER PUBLICATIONS

Federico Rossi, Saptarshi Bandyopadhyay, Michael Wolf, and Marco Pavone. Review of multi-agent algorithms for collective behavior: a structural taxonomy. IFAC—PapersOnLine, 51(12):112-117, 2018.
Jufeng Peng and Srinivas Akella. Coordinating multiple robots with kinodynamic constraints along specified paths. The International Journal of Robotics Research, 24(4):295-310, 2005.
Kostas E Bekris, Konstantinos I Tsianos, and Lydia E Kavraki. A decentralized planner that guarantees the safety of communicating vehicles with complex dynamics that replan online. In 2007 IEEE/RSJ International Conference on Intelligent Robots and Systems, pp. 3784-3790. IEEE, 2007.
Mohammad Khayatian, Mohammadreza Mehrabian, Edward Andert, Rachel Dedinsky, Sarthake Choudhary, Yingyan Lou, and Aviral Shirvastava. A survey on intersection management of connected autonomous vehicles. ACM Transactions on Cyber-Physical Systems, 4(4):1-27, 2020.
Bowen Zheng, Chung-Wei Lin, Shinichi Shiraishi, and Qi Zhu. Design and analysis of delay-tolerant intelligent intersection management. ACM Transactions on Cyber-Physical Systems, 4(1):1-27, 2019.
Mohammad Khayatian, Rachel Dedinsky, Sarthake Choudhary, Mohammadreza Mehrabian, and Aviral Shrivastava. R 2 im-robust and resilient intersection management of connected autonomous vehicles. 2020.
Yi-Ting Lin et al. Graph-based modeling, scheduling, and verification for intersection management of intelligent vehicles. ACM Transactions on Embedded Computing Systems (TECS), 18(5s):1-21, 2019.
Mohammad Khayatian et al. Crossroads+ a time-aware approach for intersection management of connected autonomous vehicles. ACM Transactions on Cyber-Physical Systems, 4(2):1-28, 2019.
Xiao-Yun Lu and J Karl Hedrick. Longitudinal control algorithm for automated vehicle merging. International Journal of Control, 76(2):193-202, 2003.
Jackeline Rios-Torres and Andreas A Malikopoulos. Automated and cooperative vehicle merging at highway on-ramps. Transactions on Intelligent Transportation Systems, 18(4):780-789, 2016.
Shunsuke Aoki and Ragunathan Rajkumar. A merging protocol for self-driving vehicles. In 2017 ACM/IEEE 8th International Conference on Cyber-Physical Systems (ICCPS), pp. 219-228. IEEE, 2017.
Shai Shalev-Shwartz, Shaked Shammah, and Amnon Shashua. On a formal model of safe and scalable self-driving cars. arXiv preprint arXiv:1708.06374, 2017.
Changliu Liu, Chung-Wei Lin, Shinichi Shiraishi, and Masayoshi Tomizuka. Distributed conflict resolution for connected autonomous vehicles. IEEE Transactions on Intelligent Vehicles, 3(1):18-29, 2017.
Florent Perronnet et al. Deadlock prevention of self-driving vehicles in a network of intersections. IEEE Transactions on Intelligent Transportation Systems, 20(11):4219-4233, 2019.
Reza Azimi, Gaurav Bhatia, Ragunathan Raj Rajkumar, and Priyantha Mudalige. Stip: Spatio-temporal intersection protocols for autonomous vehicles. In ICCPS'14: ACM/IEEE 5th International Conference on Cyber-Physical Systems (with CPS Week 2014), pp. 1-12. IEEE Computer Society, 2014.
Kurt Dresner and Peter Stone. A multiagent approach to autonomous intersection management. Journal of artificial intelligence research, 31:591-656, 2008.
Mohammad Khayatian, Mohammadreza Mehrabian, and Aviral Shrivastava. Rim: Robust intersection management for connected autonomous vehicles. In Real-Time Systems Symposium, pp. 35-44. IEEE, 2018.
Edward Andert, Mohammad Khayatian, and Aviral Shrivastava. Crossroads: Time-sensitive autonomous intersection management technique. In Proceedings of the 54th Annual Design Automation Conference 2017, p. 50. ACM, 2017.
Masoud Bashiri and Cody H Fleming. A platoon-based intersection management system for autonomous vehicles. In 2017 IEEE Intelligent Vehicles Symposium (IV), pp. 667-672. IEEE, 2017.
Lejla Banjanovic-Mehmedovic et al. Autonomous vehicle-to-vehicle (v2v) decision making in roundabout using game theory. Int. J. Adv. Comput. Sci. Appl, 7:292-298, 2016.
Bai Li et al. Cooperative lane change motion planning of connected and automated vehicles: A stepwise computational framework. In 2018 IEEE Intelligent Vehicles Symposium (IV), pp. 334-338. IEEE, 2018.
Jianqiang Nie, Jian Zhang, Wanting Ding, Xia Wan, Xiaoxuan Chen, and Bin Ran. Decentralized cooperative lane-changing decision-making for connected autonomous vehicles. IEEE Access, 4:9413-9420, 2016.
Pedro Fernandes and Urbano Nunes. Platooning of autonomous vehicles with intervehicle communications in sumo traffic simulator. In 13th International IEEE Conference on Intelligent Transportation Systems, pp. 1313-1318. IEEE, 2010.
Siyuan Gong, Anye Zhou, and Srinivas Peeta. Cooperative adaptive cruise control for a platoon of connected and autonomous vehicles considering dynamic information flow topology. Transportation Research Record, 2673 (10):185-198, 2019.
Michael During and Patrick Pascheka. Cooperative decentralized decision making for conflict resolution among autonomous agents. In International Symposium on Innovations in Intelligent Systems and Applications, pp. 154-161. IEEE, 2014.
Michael During and Karsten Lemmer. Cooperative maneuver planning for cooperative driving. IEEE Intelligent Transportation Systems Magazine, 8(3):8-22, 2016.
Mmin Chen, Chao Lu, and Wenbo Chu. A cooperative driving strategy based on velocity prediction for connected vehicles with robust path-following control. IEEE Internet of Things journal, 2020.
Mohammad Hekmatnejad et al. Encoding and monitoring responsibility sensitive safety rules for automated vehicles in signal temporal logic. In 17th ACM-IEEE Conference on Formal Methods and Models for System Design, pp. 1-11, 2019.
Apollo Auto. Apollo, An open Autonomous Driving Platform. https://github. com/ApolloAuto/apollo, 2019. [Online; accessed Oct. 14, 2019].
R Craig Coulter. Implementation of the pure pursuit path tracking algorithm. Technical report, Carnegie-Mellon UNIV Pittsburgh PA Robotics I9ST, 1992.
Rahmi Akcelik, Robin Smit, and Mark Besley. Calibrating fuel consumption and emission models for modern vehicles. In IPENZ transportation group conference, Rotorua, New Zealand, 2012.

\* cited by examiner

SYSTEMS AND METHODS FOR COOPERATIVE DRIVING OF CONNECTED AUTONOMOUS VEHICLES IN SMART CITIES USING RESPONSIBILITY-SENSITIVE SAFETY RULES

CROSS-REFERENCE TO RELATED APPLICATIONS

This is a non-provisional application that claims benefit to U.S. Provisional Patent Application Ser. No. 63/177,107 filed 20 Apr. 2021, which is herein incorporated by reference in its entirety.

GOVERNMENT SUPPORT

This invention was made with government support under grants 1525855 and 1645578 awarded by the National Science Foundation and Grant 70NANB19H144 awarded by the National Institute of Standards and Technology. The government has certain rights to the invention.

FIELD

The present disclosure generally relates connected autonomous vehicles, and in particular to cooperative driving of connected autonomous vehicles using responsibility-sensitive safety rules.

BACKGROUND

Connected Autonomous Vehicles (CAVs) are expected to enable reliable and efficient transportation systems. Most cooperative driving approaches for CAVs and motion planning algorithms for multi-agent systems are not completely safe because they implicitly assume that all vehicles/agents will execute the expected plan with a small error. This assumption, however, is hard to keep since CAVs may have to slow down (e.g. to yield to a jaywalker) or are forced to stop (e.g. break down), sometimes even without a notice. Responsibility-Sensitive Safety (RSS) defines a set of safety rules for each driving scenario to ensure that a vehicle will not cause an accident irrespective of other vehicles' behavior. However, RSS rules fall short to cover many scenarios such as merges, intersections, and unstructured roads. In addition, deadlock situations can happen that are not considered by the RSS.

In the ITS domain, many researchers have proposed methods to cooperatively manage CAVs at intersections, roundabouts, ramp-merging, performing cooperative lane changing, forming platooning in highways. Such approaches can only be applied to a specific scenario and do not scale. There have been a number of cooperative approaches that are not scenario-based. In one method, the ego CAV first determines a set of possible maneuvers that can resolve the conflict and then, select the one that has the lowest cost. The cost is determined based on energy consumption, time of maneuver, and driving comfort. In another work, a cooperative driving algorithm where the driving information of neighboring CAVs is obtained and the desired velocity is predicted using a Recursive Neural Network (RNN). A motion planner is developed using the predicted velocity using a fuzzy path-following controller. These approaches, however, do not consider cases where a CAV is unable to perform the desired maneuver/follow the assigned trajectory.

In the robotics domain, many researchers have focused on multi-agent motion planning algorithms problem. In general, cooperative motion planning algorithms can be categorized as distributed and centralized. In distributed approaches, each agent computes a path such that it avoids obstacles and other agents while in centralized approaches, a central planner (could be on each agent) computes the plan for all agents by exploring the whole design space. In general, distributed approaches are more popular as they require less computation and more resilient to changes in the plan or uncertainty. Existing motion planning algorithms for multi-agent systems and traffic management approaches for CAVs provide safety proofs based on the assumption that all agents stick to their plan or error is small. In the real world, CAVs may have to slow down and stop due to unforeseen reasons e.g. a CAV may break down. As a result, existing techniques are not absolutely safe for CAVs.

In 2017, researchers from Mobileye proposed a set of rules called RSS, which determines the minimum distance that an AV must maintain from other vehicles in order to remain safe and not being blamed for an accident. RSS rules consider the worst-case scenario for other vehicles and the ego vehicle (during the response time) to provide safety guarantees. RSS rules have been used to develop a monitoring system and are implemented in the Apollo open-source software.

The main issue with RSS is that it uses a lane-based coordinate system and safety rules are defined based on longitudinal (towards the lane) and lateral (perpendicular to the lane) distances, which cannot be applied to all driving scenarios such as intersections, merges or unstructured road where no road markings are present. In addition, RSS rules do not consider the interaction among other CAVs and therefore, cannot detect cases where a deadlock happens.

Researchers have proposed algorithms to detect and resolve deadlocks at intersections, roundabouts and network of intersections. In such approaches, a set of pre-defined zones is used to represent the occupancy of CAVs. Next, a wait-for graph is created to represent dependency between vehicles for entering conflict zones, and deadlocks are identified by detecting cycles in the graph. However, using fixed conflict zones to detect a conflict and perform deadlock resolution is either inefficient (for coarse zones) or compute-intensive (for fine zones). Furthermore, existing approaches do not consider vehicle dynamics when resolving a deadlock and assume that a deadlock is resolved in one-shot. While in reality, it takes some time for CAVs to slow down/speed up and resolve a deadlock.

It is with these observations in mind, among others, that various aspects of the present disclosure were conceived and developed.

BRIEF DESCRIPTION OF THE DRAWINGS

Corresponding reference characters indicate corresponding elements among the view of the drawings. The headings used in the figures do not limit the scope of the claims.

DETAILED DESCRIPTION

Figure 1:
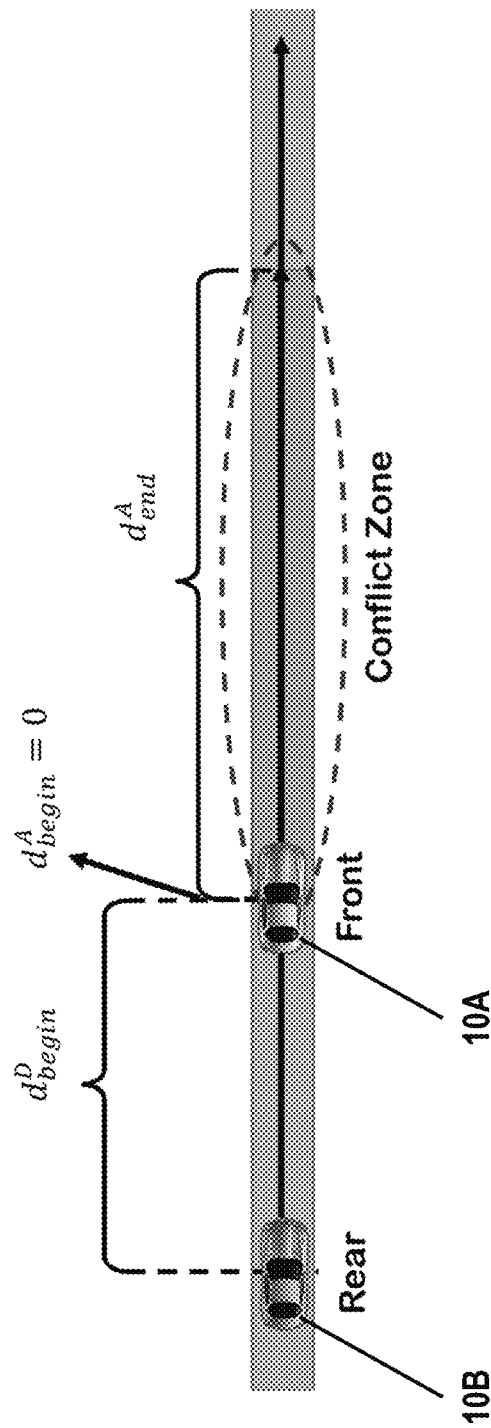
FIG. 1 is a simplified illustration showing an example of a same lane scenario with two CAVs in which the front CAV has the advantage and the distance of the front CAV from the conflict zone is zero.

Autonomous Vehicles (AVs) have the potential to make transportation safer by reducing the number of accidents that are caused due to human error. When AVs become connected (referred to as Connected Autonomous Vehicles (CAVs)), they can further improve road safety by sharing their information with each other such as position, velocity, future path, etc. In addition, CAVs are projected to improve fuel consumption, travel time, and passenger comfort through cooperative driving.

Achieving cooperative behaviors among robots is typically studied under multi-agent motion planning in the robotics domain. Existing techniques can be categorized into two groups: i) centralized; and ii) decentralized (distributed). In centralized approaches, it is assumed that a central planner exists that has access to all information and computes the trajectory for robots e.g. path-velocity decomposition technique, while in decentralized approaches, each robot is assumed to have incomplete information and autonomously determines a plan while avoiding static and moving obstacles as well as other robots. Although centralized approaches can find the optimal solution, they are computationally demanding and less tolerant of uncertainty. On the same lines, in the Intelligent Transportation System (ITS) domain, centralized and decentralized techniques are proposed where CAVs share their information with each other (through V2V) or the infrastructure (through V2I) to perform traffic management at intersections, merges.

In general, existing motion planning algorithms and traffic management techniques consider a safety buffer around each vehicle to cover for uncertainties in the localization and trajectory tracking, and then a reference trajectory is determined. A trajectory is considered to be safe if the safety buffer of the vehicle does not overlap with obstacles or other vehicles' safety buffer at any point in time. While reasonable, this definition may not provide absolute safety because it implicitly assumes that all vehicles will follow the plan (with small errors that are within the safety buffer). However, any disruption in the plan can cause an accident. For example, consider a scenario when two vehicles are driving on a street, one behind the other. If the front vehicle suddenly stops for any unplanned reason (e.g. yielding to a jaywalker), then the rear vehicle may hit the front car. In common driving parlance—the rear vehicle should not tailgate the front vehicle.

Responsibility-Sensitive Safety (RSS) approach from Mobileye+Intel addresses the safety issue from the legal/blame perspective and allows vehicles that have the right-of-the-way according to the rules of the road to change their plans. RSS proposes a set of safety rules such that if a vehicle abides by these rules, then it cannot be blamed for an accident. In the scenario that is mentioned above, RSS rules are used to determine the minimum distance at which the rear vehicle should follow the front vehicle so that it will be able to stop without causing an accident even in the worst-case scenario. RSS uses a lane-based coordinate system to define lateral and longitudinal distances between vehicles depending on the driving scenario. For example, there is a longitudinal rule for the scenario when two vehicles are one in front of the other, and there is a lateral rule for the scenario in which two vehicles are driving in parallel to each other. The longitudinal direction is toward the center-line of the lane and the lateral direction is perpendicular to the center-line of the lane. The main shortcoming of RSS is that it is scenario-based and not all scenarios are covered because longitudinal and lateral distances cannot be computed for merges, intersections, and unstructured roads where lane markings are not provided. One aspect of the present disclosure is to provide a trajectory-based definition for RSS rules, that works in all situations, including merges, intersections, and unstructured roads.

When CAVs interact with each other in different scenarios, they may face a deadlock situation where CAVs yield to each other for an indefinite time. Researchers have proposed methods to detect and resolve deadlocks at intersections and roundabouts. In existing approaches, the intersection/roundabout area is divided into a grid of zones, and vehicles that intend to occupy the same zone are said to have a conflict. Then, the dependencies between CAVs (who should enter a conflict zone first and who enters second) are represented with a directed graph, and deadlocks are resolved by removing cycles in the graph. One of the limitations of existing approaches is that they use fixed zones to detect conflicts between vehicles and the size of each zone affects the efficiency and computational complexity of the conflict detection algorithm since using coarse grids makes the schedule pessimistic and using fine grids increases the number of checks. Furthermore, in existing approaches, the dependency graph is computed individually by each CAV, which is extremely inefficient because the same computing is done redundantly and the overhead grows as the number of vehicles increases. Another aspect of the present disclosure is to provide an efficient and decentralized approach to detect and resolve deadlock where each CAV determines only its own conflicts.

Figure 2:
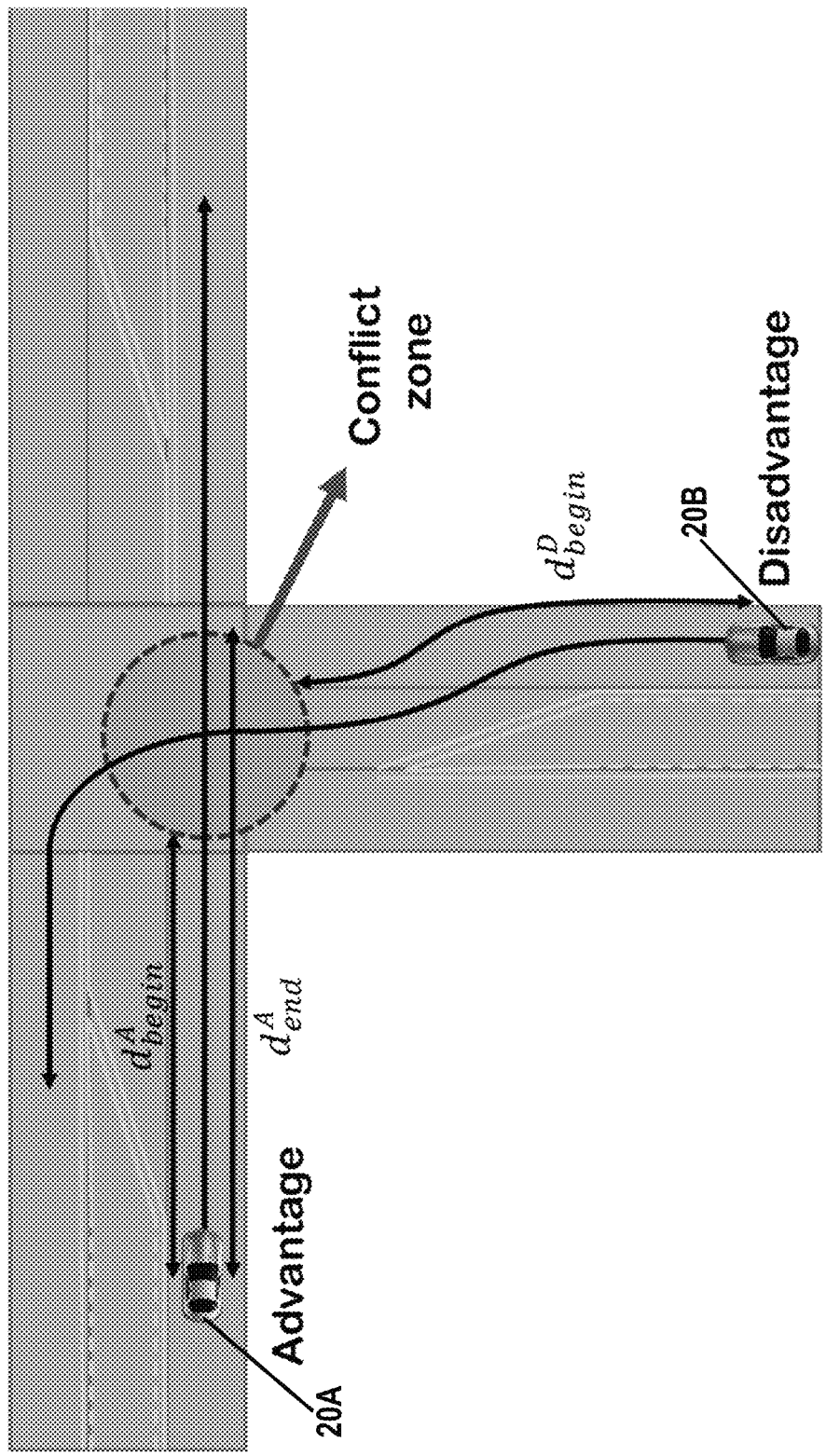
FIG. 2 is a simplified illustration showing a scenario with two CAVs approaching an intersection and their future path intersect.
Figure 3:
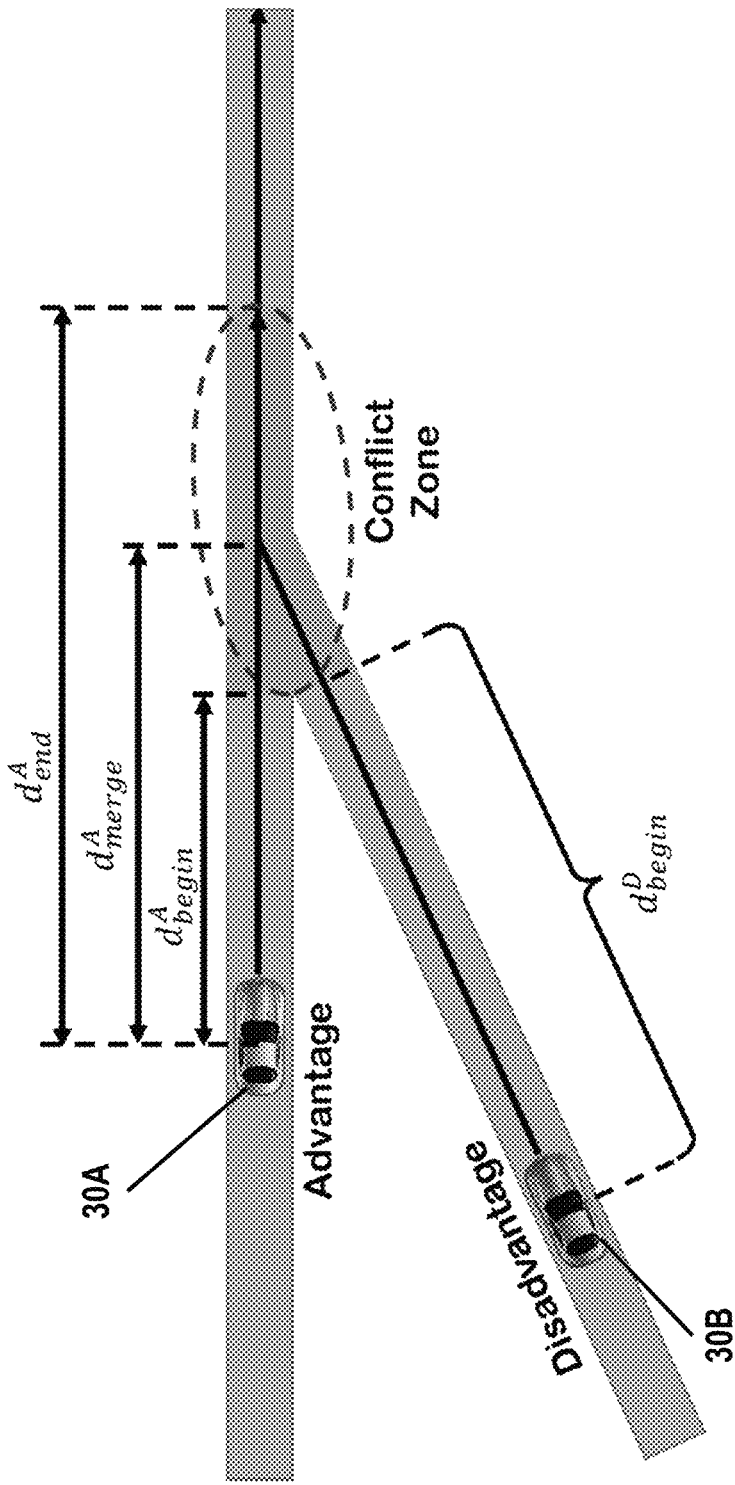
FIG. 3 is a simplified illustration showing a scenario where two CAVs are expected to be merged into the same lane in which the CAV with the earlier arrival time has the advantage.

A CAV system 100 described herein provides a cooperative driving and deadlock resolution approach for a plurality of CAVs 102. Instead of a lane-based coordinate system, the CAV system 100 uses future trajectories of CAVs 102 to represent their conflicts, which can be applied to any road geometries and situations. The CAV system 100 includes a new set of safety rules for CAVs 102 to guarantee that no accidents happen if each CAV 102 of the plurality of CAVs 102 abides by proposed RSS rules. The CAV system 100 also provides an efficient and decentralized deadlock detection and resolution mechanism for CAVs 102. The integration of the proposed RSS safety rules and deadlock resolution algorithms with motion planning is also provided. Results from conducting experiments on a realistic simulator—that considers vehicle dynamics and network delay—demonstrate that all CAVs 102 remain safe even if one or more CAVs 102 slow down or stop at any point in time. The CAV system 100 was evaluated by comparing the average travel time of CAVs 102 with a case that vehicles are autonomous but not connected. Finally, a deadlock resolution mechanism for an intersection scenario is also disclosed. Examples of conflict scenarios are illustrated in FIGS. 1-3 and will be described in greater detail in a later section below.

Figure 4A:
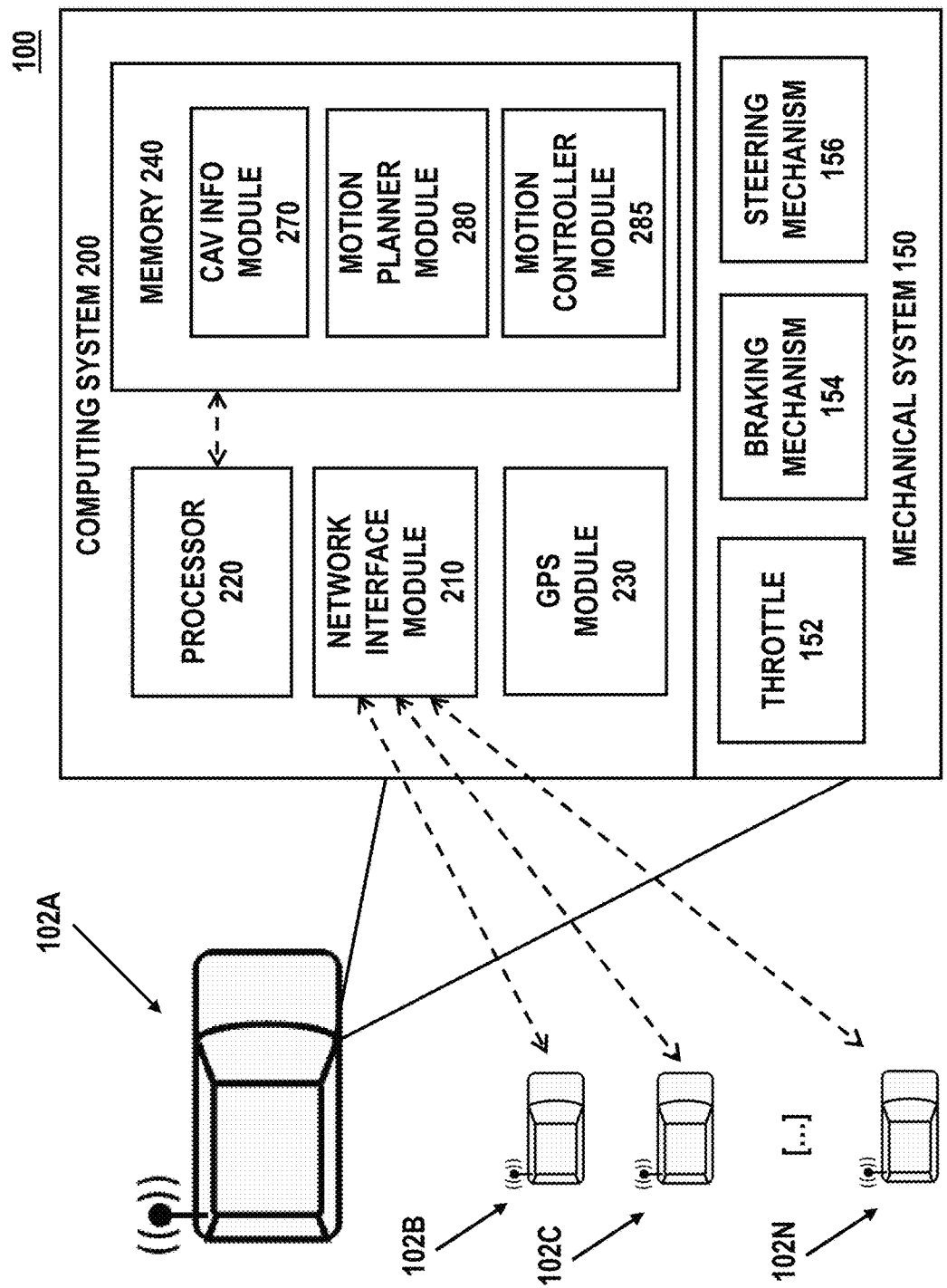
FIGS. 4A and 4B are a series of simplified block diagrams showing an overview of the CAV system and data flow between various components of the CAV system.
Figure 4B:
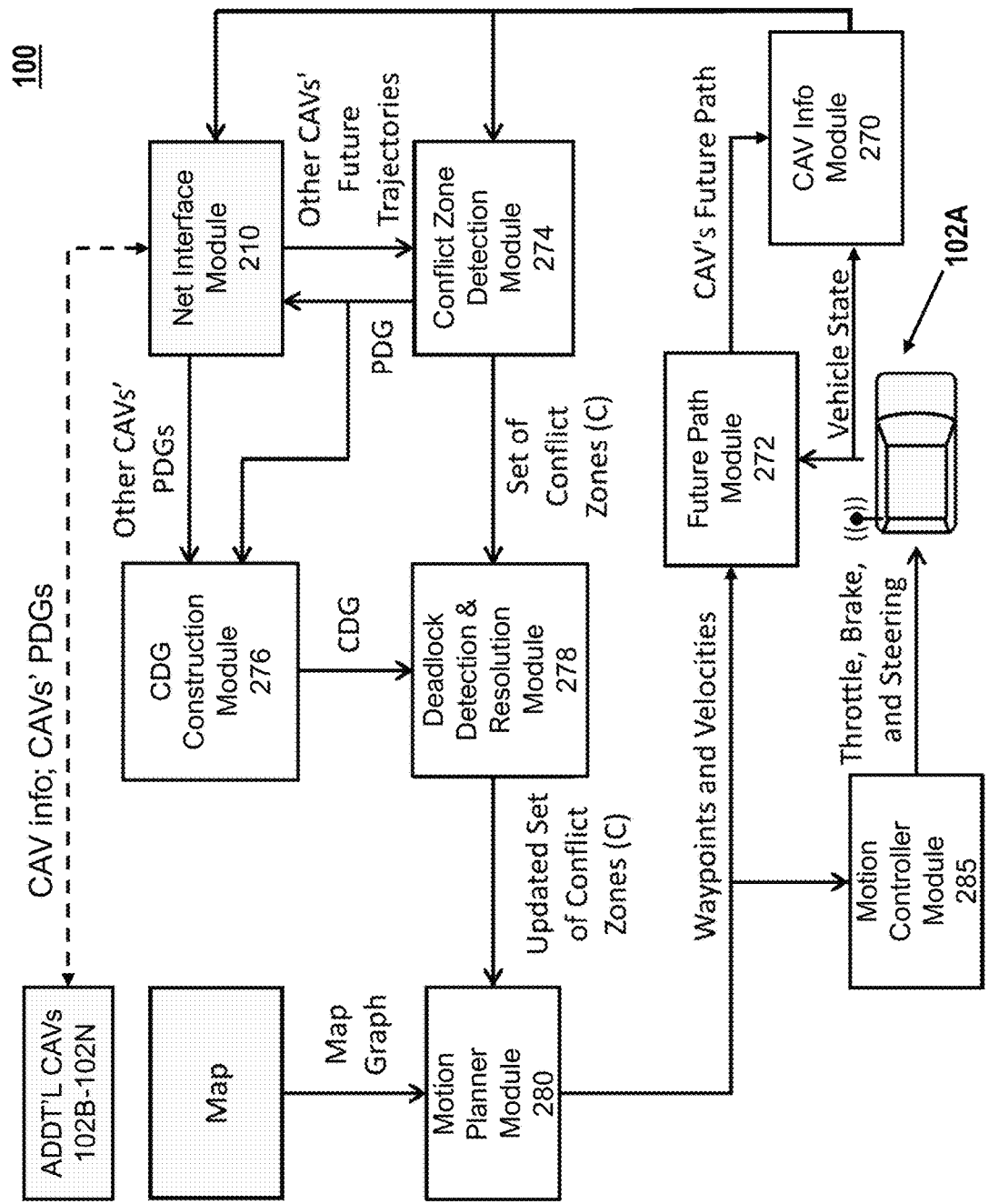

Referring briefly to FIGS. 4A and 4B, the CAV system 100 is illustrated. As shown in FIG. 4A, the CAV system 100 includes the plurality of CAVs 102 and is illustrated from the perspective of a single "ego" CAV 102A relative to a plurality of additional CAVs 102B-102N of the plurality of CAVs 102. Each CAV 102 including the ego CAV 102A includes an onboard computing system 200 in operative association with a mechanical system 150 of the respective CAV 102. The computing system 200 includes a processor 220 in association with a memory 240, which includes various modules including a CAV info module 270 that aggregates and stores operating information specific to the CAV 102, a motion planner module 280 that plans a motion of the CAV 102 as will be discussed in greater detail herein, and a motion controller module 285 that controls the motion of the CAV 102. The motion controller module 285 applies one or more electrical inputs to various components of the mechanical system 150, including but not limited to a throttle 152 that controls an acceleration of the CAV 102, a braking mechanism 154 that controls a deceleration of the CAV 102, and a steering mechanism 156 that controls a trajectory angle of the CAV 102. Additionally, the computing system 200 can include a GPS module 230 operable to determine a latitudinal "x" position, a longitudinal "y" position, an instant velocity, and also provide a clock time to the CAV 102 such that timestamps for all CAVs 102 are accurate to one another. The computing system 200 further includes a network interface module 210 operable to facilitate communication to and from other CAVs 102.

Turning to FIG. 4B, a data flow diagram is illustrated showing additional modules of the computing system 200 communicating with one another. Similarly, FIG. 4B is shown from the perspective of an ego CAV 102A relative to additional CAVs 102B-102N; however, any CAV 102 within the CAV system 100 can be considered the ego CAV 102A. The ego CAV 102A maintains various values related to a vehicle state in the CAV Info module 270, including but not limited to ID, x and y position, velocity, timestamp, some of which are communicated to a future path module 272 that determines a future path of the ego CAV 102A based on a known starting position and destination position of a world map. The future path determined by future path module 272 can be an array of x-y coordinates or "waypoints" stored within CAV Info module 270. The information maintained by CAV info module 270 including the future path is periodically broadcast to additional CAVs 102B-102N by the network interface module 210, which also receives future paths from the additional CAVs 102B-102N.

Future paths periodically received from additional CAVs 102B-102N are passed to a Conflict Zone Detection Module 274 that compares the future path of the ego CAV 102A with the future paths received from additional CAVs 102B-102N to identify a set of conflict zones (C) where the future paths conflict with one another. The Conflict Zone Detection Module 274 additionally creates a Partial Dependency Graph (PDG) for the ego CAV 102A that indicates conflict relationships between the future paths of the ego CAV 102A and the additional CAVs 102B-102N. However, the ego CAV 102A is initially ignorant to conflict relationships between the additional CAVs 102B-102N that the ego CAV 102A is not directly involved with. To remedy this, the ego CAV 102A broadcasts its PDG to the additional CAVs 102B-102N through the network interface module 210, and in turn receives a plurality of additional PDGs from the additional CAVs 102B-102N that are each calculated from the perspectives of each respective additional CAV 102B-102N. Using the PDG belonging to the ego CAV 102A and the additional PDGs from the additional CAVs 102B-102N, the ego CAV 102A constructs a Complete Dependency Graph (CDG) at a CDG construction module 276 that indicates conflict relationships between all involved CAVs 102 including the ego CAV 102A and the additional CAVs 102B-102N. This reduces computational burden on each CAV 102 as they do not need to redundantly calculate relationships between all CAVs 102 involved in the CAV system 100. Note that as each CAV 102 considers itself to be the ego CAV, each involved CAV 102 constructs its own CDG based on the PDGs it receives from other CAVs 102 including the example ego CAV 102A.

A Deadlock Detection and Resolution module 278 of the ego CAV 102A uses the constructed CDG and the set of conflict zones (C) to iteratively detect and resolve any "deadlocks" that are present within the CAV system 100 as will be described in greater detail below. Deadlock resolution results in an updated set of conflict zones (C) that are passed to the motion planner module 280, which uses a world map graph to determine a planned motion of the ego CAV 102 including various waypoints and optimal velocities along an optimized future path of the ego CAV 102A. Based on results from the Deadlock Detection and Resolution module 278, the ego CAV 102A can iteratively re-evaluate and update its future path; in some scenarios the "updated" future path can change if the ego CAV 102A is expected to yield to another CAV 102, or the "updated" future path can stay the same if the ego CAV 102A is not expected to yield. These values are additionally used by the motion controller module 285 to interpret the planned motion into electrical inputs for the mechanical system 150 of the ego CAV 102A, including the throttle 152, the braking mechanism 154, and the steering mechanism 156.

Generic Formulation of RSS Rules

In this section, a trajectory-based formulation is introduced for RSS rules. The advantage of this approach is that the rules are generic and can be applied to all cases, including unstructured roads.

Given the future paths of CAVs 102 are known, each CAV 102 can determine a set of conflict zones C. A conflict zone $C_i \subset C$ is defined as a convex contour that includes a subset of future paths (FP) of two CAVs 102 where a distance between the future paths is less than a threshold, $d_{th}$. Since two CAVs 102 may have more than one conflict, only consecutive edges that have a distance of less than $d_{th}$ are considered to be a part of the same conflict zone $C_i$. The midpoints of the edges are used to calculate the distance between two edges from two future paths. To specify the boundaries of a conflict zone, midpoints of first and last edges are used.

Based on the road geometry and rules of the road, every pair of CAVs 102 can determine who has an "advantage" to enter the conflict zone first and who has a "disadvantage" of entering the conflict zone second. For simplicity, it is assumed that a CAV 102 with an earlier arrival time has the advantage. Without loss of generality, it is assumed that in any pair of CAVs 102 approaching a conflict zone, a first CAV 102 has the advantage, and a second CAV 102 has the disadvantage. The CAV system 100 represents the distance of the CAV 102 with the advantage from the beginning of the conflict zone and from the end of the conflict zone with $a_{begin}^A$ and $a_{end}^A$, respectively. Similarly, the CAV system 100 represents the distance of the CAV 102 with disadvantage from the beginning of the conflict zone with $a_{begin}^D$. FIGS. 1, 2, and 3 show different scenarios for example CAVS 102 (where CAVS 102 with advantages are respectively labeled as 10A, 20A and 30A, and where CAVS 102 with disadvantages are respectively labeled as 10B, 20B and 30B) where the $a_{begin}^A$, $a_{end}^A$ and $a_{begin}^D$ are shown. It is assumed that Equation 1 represents the dynamics of each respective CAV 102.

Vehicle dynamics will be discussed herein from the perspective of an "ego" CAV 102A of the plurality of CAVs 102 relative to other "additional" CAVs 102B-102N of the plurality of CAVs 102, where N is a total number of involved CAVs 102 of the plurality of CAVs 102 including the "ego" CAV 102A. For the examples provided herein and without loss of generality, the "ego" CAV 102A can be any CAV 102 of the plurality of CAVs 102 and can be at an advantage or a disadvantage when approaching a conflict zone, depending on the scenario. Similarly, other "additional" CAVs 102B-102N each respectively consider themselves to be an "ego" CAV with all other CAVs 102 involved in the system 100 being "additional" CAVs. The vehicle dynamics described herein apply individually to each CAV 102 of the plurality of CAVs 102. The following vehicle dynamics from the perspective of the "ego" CAV 102A are assumed:

$$\begin{cases} \dot{x} = v\cos(\phi) \\ \dot{y} = v\sin(\phi) \\ \dot{\phi} = \frac{v}{L}\tan(\psi) \\ \dot{v} = a \end{cases} \quad (1)$$

where x and y respectively represent a latitudinal position and a longitudinal position of the ego CAV 102A on the world map in Cartesian coordinates, $\phi$ is a heading angle of the ego CAV 102A from the x-axis, v and a are linear velocity and acceleration of the ego CAV 102A respectively, L is a wheelbase distance of the ego CAV 102A and $\psi$ is a steering angle of front wheels with respect to the heading of the ego CAV 102A. In order to make the model more realistic, the CAV system 100 considers an upper bound and a lower bound on the acceleration rate and steering angle of the ego CAV 102A as: $\in [a_{min}, a_{max}]$ and $\Psi \in [\Psi_{min}, \Psi_{max}]$ where $a_{max}$ and $a_{min}$ are the maximum acceleration and deceleration rates and $\Psi_{max}$ and $\Psi_{min}$ are the maximum and minimum steering angles of the ego CAV 102A.

For simplicity, the trajectory of the ego CAV 102A is projected onto its path and represented with a double-integrator model. As a result, a stop distance of the ego CAV 102A in the case of being at an advantage when entering a conflict zone is calculated as:

$$d_{stop}^A = \frac{v_A^2}{2|a_{brake}|} \quad (2)$$

The CAV system 100 assumes that the ego CAV 102A (and each of the additional CAVS 102B-102N) broadcasts its information every T milliseconds and a worst-case end-to-end delay (p) is 2T. Taking into account the delay, a worst-case stop distance of the ego CAV 102A in the case of being at a disadvantage when entering a conflict zone is calculated as:

$$d_{stop}^D = v_D \rho + \frac{1}{2} a_{ACC} \rho^2 + \frac{(v_D + a_{ACC}\rho)^2}{|2a_{brake}|} \quad (3)$$

The first two terms ($v_D\rho$ and $\frac{1}{2}a_{ACC}\rho^2$) indicate that the ego CAV 102A with disadvantage may be accelerating in the worst-case scenario while waiting for broadcast information from an additional CAV 102B with an advantage when entering a conflict zone. If a distance from the end of the conflict zone of the additional CAV 102B with advantage is greater or equal to the stop distance of the additional CAV 102B with advantage ($d_{end}^A \geq d_{stop}^A$), there is a possibility that it may slow down and stop inside the conflict zone and block the ego CAV 102A with the disadvantage. Otherwise, there is no conflict. Accordingly, the modified RSS rule is defined as:

DEFINITION 1. General RSS Rule: Given the entering order of an ego CAV 102A and an additional CAV 102B to a conflict zone is known, the minimum safe distance to maintain from the conflict zone ($d_{SAFE}^D$) for an ego CAV 102A having a disadvantage is:

$$d_{SAFE}^D = \begin{cases} d_{stop}^D - d_{scenario}^A + \frac{VL_A + VL_D}{2} & \text{if } d_{end}^A > d_{stop}^A \\ 0 & \text{otherwise} \end{cases} \quad (4)$$

where $d_{scenario}^A$ is the scenario-dependent distance that the other CAV 102B with advantage travels inside the conflict zone, $VL_D$ is the vehicle length for the ego CAV 102A with the disadvantage and $VL_A$ is the vehicle length for the other CAV 102B with the advantage. Since the distance values are calculated based on the centers of the CAVs 102A and 102B, the term $$\frac{VL_A + VL_D}{2}$$

is added. In addition, the following rule should be satisfied to make sure the travelled distance during the response time of the ego CAV 102A with disadvantage is not greater than the safe distance:

$$d_{SAFE}{}^D > v_D \rho + \tfrac{1}{2} a_{ACC} \rho^2 \qquad (5)$$

Note that while the above explanation is in terms of the ego CAV 102A being at a disadvantage relative to the other CAV 102B, the above can also be applied vice-versa with the ego CAV 102A being at an advantage and the other CAV 102B being at a disadvantage.

LEMMA 3.1. If the CAV with disadvantage always maintains a distance of at least $d_{SAFE}{}^D$ from its conflict zone, it will not hit the CAV with advantage even if it changes its plan and decelerates at any point in time.

PROOF. If the distance of a CAV 102 with the advantage from the end of the conflict zone is smaller than its stop distance, $d_{end}{}^A < d_{stop}{}^A$, the CAV 102 with the advantage will stop outside of the conflict zone even if it decelerates at a rate of smaller than or equal to $a_{brake}$.

If the distance of the CAV 102 with the advantage from the end of the conflict zone is greater than its stop distance, $d_{end}{}^A < d_{stop}{}^A$, the CAV 102 with the advantage may stop inside the conflict zone if it decelerates. In this case, the CAV 102 with disadvantage will be notified after $\rho$ milliseconds in the worst-case scenario. If the CAV 102 with disadvantage accelerates at a rate of smaller than or equal to $a_{ACC}$ during this time interval ($\rho$) and then decelerates at a rate of $a_{brake}$, its stop distance will be equal to $d_{stop}{}^D$ (Eq. (3)) and the CAV 102 with disadvantage will not enter the conflict zone and no accident will happen. For scenarios where the scenario-dependent distance is not zero, $d_{scenario}{}^A > 0$ (same lane and merge), the paths of the CAVs 102 overlap and if the CAV 102 with advantage decelerates, it will allow the other CAV 102 with disadvantage to travel through the conflict zone by $d_{scenario}{}^A$ and still be safe. As a result, the required safe distance is $d_{stop}{}^D - d_{scenario}{}^A$.

Next, a few case studies will be discussed and show how the safe RSS distance is calculated for each scenario.

Same Lane

Let us consider an example scenario where two CAVs 10 including a first CAV 10A and a second CAV 10B are driving in the same lane as depicted in FIG. 1. The first CAV 10A has the advantage since its arrival time at the conflict zone is smaller than the second CAV 10B. In this example, the ego CAV 102A could be the first CAV 10A (which would make the additional CAV 102B the second CAV 10B) or the second CAV 10B (which would make the additional CAV 102B the first CAV 10A) depending on an arrival order of the ego CAV 102A relative to the additional CAV 102B.

Since the path of the first CAV 10A overlaps with the path of the second CAV 10B, $d_{scenario}{}^A = d_{stop}{}^A$, which means the first CAV 10A travels $d_{stop}{}^A$ meters inside the conflict zone before a complete stop and the second rear CAV second CAV 10B. has $d_{stop}{}^A$ meters more to stop. According to Equation (4), the required safe distance for the second CAV 10B ($d_{SAFE}{}^D$) to maintain from the conflict zone/first CAV 10A is:

$$d_{SAFE}^D = d_{stop}^D - d_{stop}^A + \frac{VL_D + VL_A}{2}$$

where $d_{stop}{}^D$ and $d_{stop}{}^A$ are calculated according to Equation 2 and 3.

Intersection

Now, let us consider a scenario where two CAVs 20 including a first CAV 20A and a second CAV 20B approach an intersection and their future path crosses inside the intersection area as it is depicted in FIG. 2. The CAV system 100 assumes the arrival time of the first CAV 20A to be earlier than the second CAV 20B and therefore, the first CAV 20A has the advantage. In this example, the ego CAV 102A could be the first CAV 20A (which would make the additional CAV 102B the second CAV 20B) or the second CAV 20B (which would make the additional CAV 102B the first CAV 20A) depending on an arrival order of the ego CAV 102A relative to the additional CAV 102B.

If the first CAV 20A stops anywhere inside the conflict zone, it is not safe for the second CAV 20B to enter the conflict zone. Therefore, the scenario-dependent distance is zero, $d_{scenario}{}^A = 0$. As a result, the following is given:

$$d_{SAFE}^D = \begin{cases} d_{stop}^D + \dfrac{VL_A + VL_D}{2} & \text{if } d_{end}^A \geq d_{stop}^A \\ 0 & \text{otherwise} \end{cases}$$

If the distance of the first CAV 20A from the end of the conflict zone is smaller than its stop distance, even in the worst-case (if the first CAV 20A decelerates at the maximum rate), the first CAV 20A will stop outside the conflict zone and does not cause a conflict for the second CAV 20B. In this case, there will be no conflicts and $d_{SAFE}{}^D = 0$.

Merge

Next, the CAV system 100 considers a merge scenario where two CAVs 30 merge into the same lane as it is shown in FIG. 3. Without loss of generality, the CAV system 100 assumes that a first CAV 30A has the advantage and a second CAV 30B has disadvantage respectively. In this example, the ego CAV 102A could be the first CAV 30A (which would make the additional CAV 102B the second CAV 30B) or the second CAV 30B (which would make the additional CAV 102B the first CAV 30A) depending on an arrival order of the ego CAV 102A relative to the additional CAV 102B.

In this scenario, the scenario-dependent distance is $d_{scenario}{}^A = \min(0, d_{stop}{}^A - d_{merge}{}^A)$, where $d_{merge}{}^A$ is the distance of the first CAV 30A with advantage from the merging point, which is indicated in FIG. 3. As a result, the second CAV 30B must maintain a minimum distance of:

$$d_{SAFE}^D = d_{stop}^D - \min(0, d_{stop}^A - d_{merge}^A) + \frac{VL_D + VL_A}{2}$$

from the conflict zone. Note that once the second CAV 30B reaches the merge point, the $d_{scenario}{}^A$ is changed. The lateral case in the original RSS rules (two CAVs driving on adjacent lanes) can be modeled like a merging case. If a first CAV 30A attempts to merge into the other lane occupied by the second CAV 30B, it is only allowed if the created conflict zone is far enough from the second CAV 30B i.e. at least $d_{max}$.

Cooperative Driving System

An algorithm that runs on each CAV 102 assuming no deadlock situation happens will be discussed from the perspective of the ego CAV 102A. It should be noted that each respective CAV 102 of the plurality of CAVs 102 considers itself to be an "ego" CAV 102A relative to a plurality of additional CAVS 102B-102N. Further, a deadlock resolution algorithm will also be discussed.

Main Algorithm

Given the initial position and final destination of the ego CAV 102A are known, a motion planner module 280 onboard the ego CAV 102A uses the world's map to determine the shortest route (R) that connects the current position of the ego CAV 102A to the destination of the ego CAV 102A. The CAV system 100 assumes that at least one feasible path exists that connects the current location of the ego CAV 102A to its destination. The world map, M(N,E), is a directed graph where N is a set of nodes (referred to herein as "waypoints") and E is a set of edges or connections between waypoints. Each edge of the map graph has a weight, w, which indicates the maximum velocity for that segment of the road. In the motion planner module 280, it is assumed that the computation time and communication time for the ego CAV 102A are bounded by T.

In a periodic manner, each CAV 102 broadcasts through network interface module 210 a set of CAV information which can in some embodiments be stored in a CAV info module 270 and can include ID, x and y position, velocity, timestamp, and its future path (FP), which is an array of x-y coordinates. The CAV system 100 assumes that all CAV 102 synchronize their clocks using GPS so that timestamps are captured with clocks that have almost the same notion of time. When the ego CAV 102A receives sets of CAV information of other additional CAVs 102B-102N, the ego CAV 102A checks if their paths intersect or the distance between their paths is less than a threshold. If so, the ego CAV 102A computes a set of conflict zones (C). For each conflict zone, the ego CAV 102A determines which vehicle has the advantage to enter the conflict zone first based on who is expected to reach the conflict zone first. To detect possible deadlocks, the ego CAV 102A computes a graph called Partial Dependency Graph (PDG), which represents the dependency among other additional CAVs 102B-102N and itself (i.e. who should yield to who over a conflict zone). Next, the ego CAV 102A broadcasts the computed PDG, and after receiving other PDGs from additional CAVs 102B-102N, the ego CAV 102A constructs a Complete Dependency Graph (CDG) to detect and resolve possible deadlocks. Finally, if the ego CAV 102A has disadvantage over a conflict zone, the ego CAV 102A computes a safe velocity so that it always maintains a safe distance from that conflict zone. Based on the determined velocity, the weights of some of the edges are updated to reflect the presence of the additional CAVs 102B-102N and to make sure a safe distance is always maintained from the conflict zone. Then, the motion planner module 280 runs the shortest path algorithm again to check if a shorter path exists that does not cause a new conflict. Finally, the motion controller module 285 uses a subset of future waypoints of the future path and velocities of corresponding edges to determine desired velocity and control inputs (steering angle and acceleration) for the mechanical system 150 of the ego CAV 102A. Algorithm 1 shows the pseudo-code of the algorithm that is executed on each CAV 102. To have a better understanding of the algorithm, different components of the CAV system 100 and their relationships have been depicted in FIGS. 4A and 4B. Next, the functionality of each component of the algorithm will be discussed.

Future Path Computation

The ego CAV 102A broadcasts the set of CAV information including its ID, position (x, y), velocity (v), and the corresponding timestamp (ts) as well as its future path ($(x_1, y_1), \ldots, (x_n, y_n)$) to all additional CAVs 102B-102N. Assuming the motion controller module 285 is tuned to have a short settling time, the ego CAV 102A will track its path with a negligible error. As a result, the future position of the ego CAV 102A is represented with a subset of its expected route (R). Given $R \subset M(N,E)$ is the route of the ego CAV 102A, the future path of the ego CAV 102A, $FP \subset R$ is calculated as follows which includes n points:

---
Algorithm 1: CAVs algorithm
---
while has not reached the destination do
  | FP = compute_future_path( );
  | CAV_info = [x, y, v, ts, FP, ID];
  | broadcast(CAV_info);
  | others_info = receive_other_CAVs_info( );
  | for each member of other_CAVs_info do
  | | [C, PDG] = find_conflict_zones(CAV_info,
  | |   others_info);
  | end
  | broadcast(PDG);
  | others_PDG = receive_other_PDGs( );
  | CDG = construct_CDG(PDG,| other_PDGs);
  | C = deadlock_resolution(C, CDG);
  | if ego CAV has disadvantage over a conflict zone then
  | | [FP, velocity] = motion_planner(C, Map);
  | end
  | motionController(FP, Velocity);
end
---

$$FP = \left\{ (x_i, y_i) \in R \middle| \left( \sum_{i=2}^{i=n} \sqrt{(x_i - x_{i-1})^2 + (y_i - y_{i-1})^2} \right) < d_{max} \right\} \quad (6)$$

where $d_{max}$ is the fixed length of the future path calculated as:

$$d_{max} = v_{max}(\rho + t_b) \quad (7)$$

where ρ represents the worst-case end-to-end delay from the ego CAV 102A capturing its information and broadcasting it, to actuation of an additional CAV 102B based on the received information (see FIG. 5) and $t_b$ is the worst-case brake time which can be calculated as $$t_b = \frac{v_{max}}{|a_{brake}|}.$$

Figure 5:
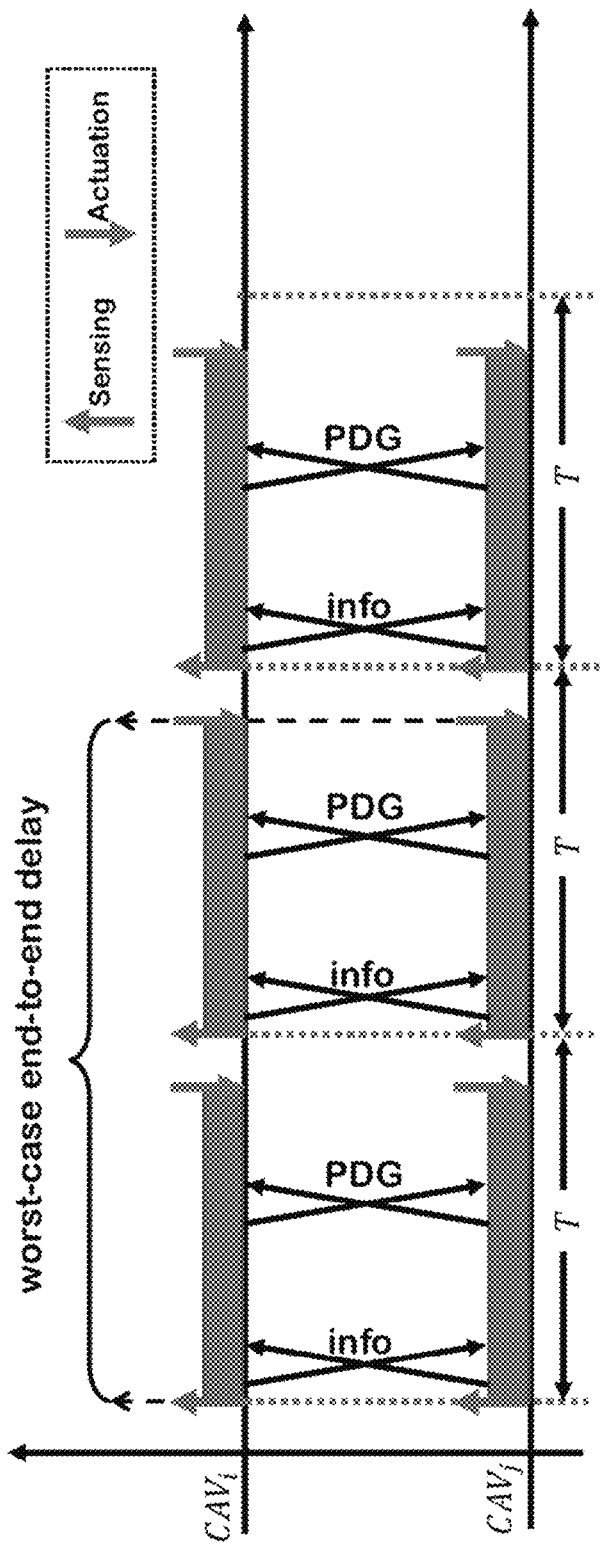
FIG. 5 is a simplified illustration showing CAVs performing computation and communication in a synchronized manner.

FIG. 5 snows me execution profile of the algorithm on two CAVs 102 (i and j) (where CAV i can be considered to be the ego CAV 102A and CAV j can be considered to be an additional CAV 102B, or vice versa). Let it be assumed that CAVs i and j have a conflict and CAV i (top) has the advantage. If CAV i slows down due to any reason right after sensing and broadcasting its info, the CAV j will not be notified until receiving the next broadcast. As a result, the worst-case end-to-end delay (ρ) is bounded by 2T as depicted in FIG. 5. By computing the $d_{max}$ based on the worst-case info sharing delay and worst-case braking time, the CAV system 100 ensures that for the first time that two CAVs 102A and 102B detect that they have a conflict, the CAV 102A or 102B with the disadvantage will have enough distance to safely stop without entering the conflict zone, even in the worst-case scenario.

Conflict Zone Detection

Despite existing approaches that use fixed conflict zones, the CAV system 100 uses expected trajectories of the CAVS 102 to detect a conflict zone. As mentioned before, a future path (FP) is used to represent an expected future position of the ego CAV 102A. First, the ego CAV 102A computes the distance between the mid-point of edges on its path. All contiguous edges that have a distance less than $d_{th}$ are considered to be a part of the same conflict zone.

Figure 6:
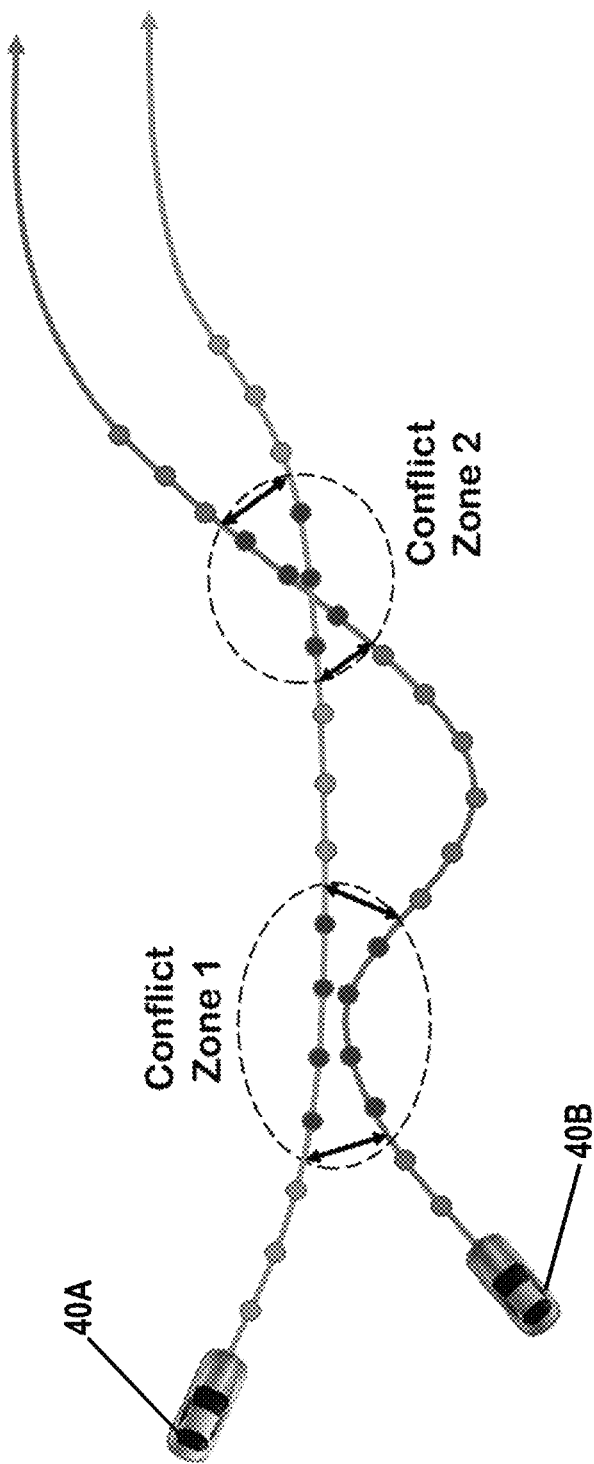
FIG. 6 is an illustration showing an example of two CAVs with arbitrary paths and two conflict zones in which each conflict zone includes parts of the CAV path where the distance between paths of CAVs is less than the threshold.

Two CAVs 40A and 40B may have multiple conflicts on their paths as depicted in FIG. 6. In this example, the ego CAV 102A could be the first CAV 40A (which would make the additional CAV 102B the second CAV 40B) or the second CAV 40B (which would make the additional CAV 102B the first CAV 40A) depending on an arrival order of the ego CAV 102A relative to the additional CAV 102B. Each conflict zone $C_i$ is a data structure that includes waypoints that are inside the conflict zones, distances of CAVs 40A and 40B from the beginning and end of the conflict zone, their expected arrival time at the conflict zone (Equation 8) and the ID of the CAV 40A that has the advantage. The CAV system 100 computes the arrival times for both CAVs 40A and 40B assuming the CAVs 40A and 40B drive at a constant velocity:

$$TOA_i = \frac{d_{begin}^i}{v_i} \quad (8)$$

where $d_{begin}^i$ is the distance of the CAV i (40A or 40B) from the conflict zone and $v_i$ is the velocity of the CAV i (40A or 40B). Since the algorithm is executed periodically (every T ms), the value of $TOA_i$ is updated as the velocity of the CAV i (40A or 40B) changes. If a CAV 40A or 40B is stopped inside a conflict zone, its arrival time is set to zero. By default, the CAV 40A with the earliest arrival time will have the advantage unless it is changed to resolve a deadlock (explained later) or the other CAV 40B has a priority (e.g. opposite direction). If two CAVs 40A and 40B have the same arrival time, the CAV 40A with the lower ID will have the advantage to break the tie. In addition, if the difference between the arrival times of two CAVs 40A and 40B is within the accuracy of the clock synchronization (±10 nanoseconds for GPS), they use the ID to determine who has the advantage.

Motion Planner

If the ego CAV 102A has disadvantage over a conflict zone, it first checks if an alternative path exists such that it avoids all the conflicts. If such a path exists, the ego CAV 102A selects that path and if not, the ego CAV 102A calculates a safe velocity ($v_{SAFE}$) to be maintained so that the ego CAV 102A is always safe. The safe velocity, $v_{SAFE}$, is determined based on the minimum safe distance that the ego CAV 102A must maintain from the conflict zone given that the additional CAV 102B—which has the advantage—may slow down at any point in time and stop inside the conflict zone.

Maximum Safe Velocity: For each segment of the road that has a distance of $d_C$ from the conflict zone, the maximum safe velocity for the ego CAV 102A is computed using Equation 9.

$$v_{SAFE} = \frac{-(2\rho a_{ACC} + 2|a_{brake}|) + \sqrt{\Delta}}{2} \quad (9)$$

where $\Delta = 4\left(a_{brake}^2 + 2a_{ACC}\rho a_{brake} - a_{ACC}\rho^2 a_{brake} - 2d_C|a_{brake}|\right)$.

Equation 9 is determined by solving Equation 3 for $v_D$ when the distance from the conflict zone is $d_C$. $d_C$ can be calculated using Equation 12. Equation (9) ensures that the ego CAV 102A with disadvantage has always a minimum distance of $d_{SAFE}^D$ from the conflict zone.

Once the safe velocity is determined for each conflict zone ($C_i$), the motion planner module 280 of the ego CAV 102A updates weights of the map M(N,E), to account for the presence of the additional CAVs 102B-102N and generates safe velocities for the motion controller module 285 of the ego CAV 102A. To account for the presence of the additional CAVs 102B-102N, the motion planner module 280 determines, U the set of all edges ($e_i$) that are connected to waypoints that are on the future path of other CAVs 102B-102N:

$$U = \{e_i \in E | e_i \in \text{connected}(FP)\} \quad (10)$$

where connected(FP) is the set of all edges that are connected to waypoints in the set FP. To account for the safe RSS distance, the motion planner module 280 of the ego CAV 102A determines $U_D$, the set of all edges that are connected to the waypoints that are on the future path of the ego CAV 102A with disadvantage ($FP_D$) and are either a member of the conflict zone set (C) or within the safe distance ($d_{SAFE}^D$) of the conflict zone.

$$U_D = \{e_i \in E | e_i \in \text{connected}(FP_D^C)\} \quad (11)$$

where connected($FP_D^C$) is the set of all edges that are connected to waypoints in the set ($FP_D^C$).

Figure 7:
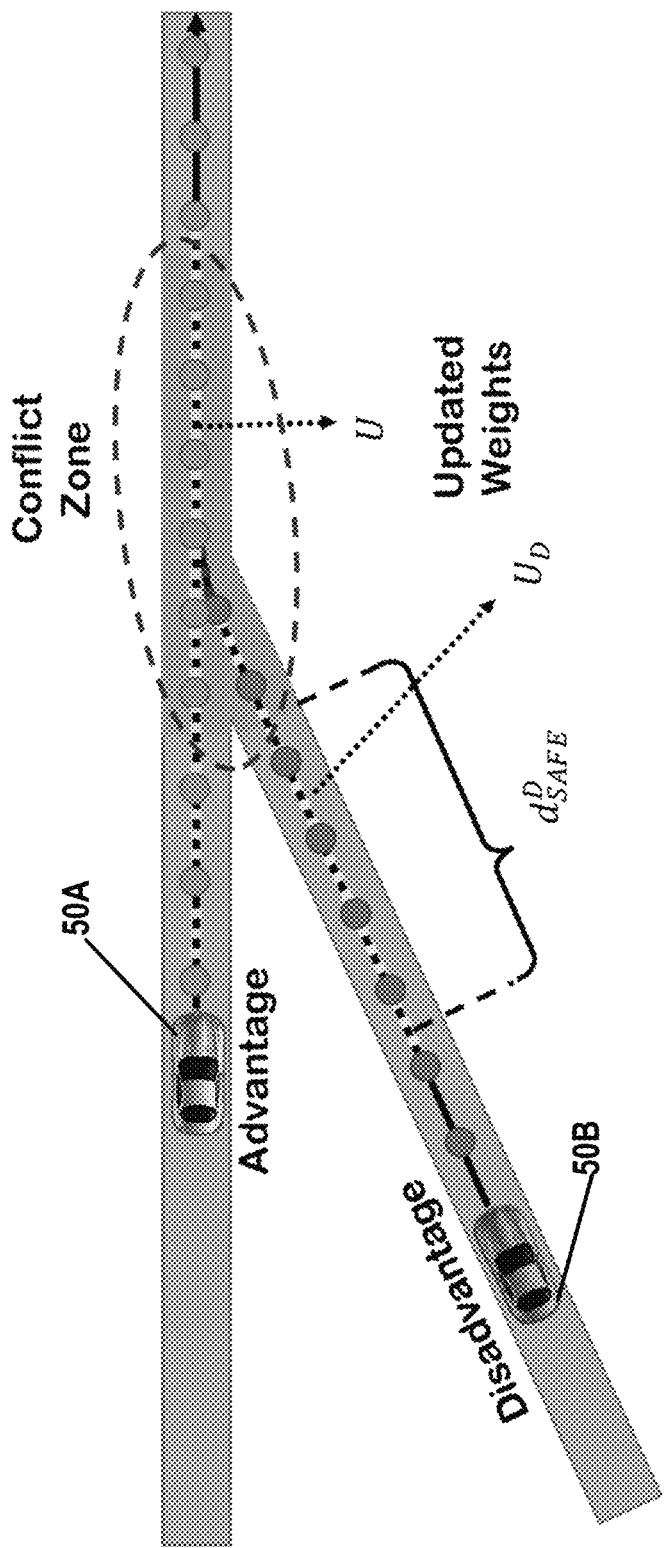
FIG. 7 is a simplified illustration showing weights of the edges on a path of the other CAV and edges on the path of the ego CAV being updated to account for the presence of other CAVs as well as the conflict zone and the required safe distance.

FIG. 7 shows a merge scenario and future paths of two CAVs 50. In this example, the ego CAV 102A could be the first CAV 50A (which would make the additional CAV 102B the second CAV 50B) or the second CAV 50B (which would make the additional CAV 102B the first CAV 50A) depending on an arrival order of the ego CAV 102A relative to the additional CAV 102B. Weights of all edges connected to nodes that are on the path of a first CAV 50A with advantage and all edges that are on the path of the second CAV 50B and are either within the safe distance of or inside the conflict zone are updated. The set UP and U are highlighted on the path. The subset of future point, $FP_D^C$, is determined as:

$$FP_D^C = \{n_i \in N | n_i \in FP_D \text{ and } n_i \in C \text{ or } n_i \in \text{within}(C_j)\}$$

within ($C_j$) is the set of all waypoints that where their distance from the conflict zone j is less than $d_{SAFE}$. To calculate the distance between two waypoints, the CAV system 100 uses the following equation:

$$\text{distance} = \sum_{i=2}^{N} \sqrt{(x_i - x_{i-1})^2 + (y_i - y_{i-1})^2} \quad (12)$$

where N in Equation 12 is the number of waypoints including the first and last way-points. Finally, weights of each edge in set U and $U_D$ are updated based on their distance from the conflict zone using the safe velocity from Equation 9:

$$w_i = \frac{l}{v_{SAFE}^i} \quad (13)$$

where i refers to each segment of the road, l is the length of the corresponding edge and $v_{SAFE}^i$ is the safe velocity calculated for each segment of the road (edge). Since the weight of an edge may be updated multiple times—as it may be involved in more than one conflict—, the maximum weight is considered (the slowest safe velocity) for an edge. If the safe velocity $v_{SAFE}$ is equal to zero, instead of infinity, the weight is set to be a large constant number.

After updating the weights, the motion planner module 280 of the ego CAV 102A uses the Dijkstra algorithm to find the shortest path to the destination. The summation of weights ($\Sigma w_i$) from the source to the destination corresponds to the travel duration.

Motion Controller

The motion controller module 285 uses the future waypoints and safe velocities to calculate the reference heading angle $\theta_{ref}$ and the safe velocity $v_{ref}$ for the ego CAV 102A. For the desired heading angle ($\theta_{ref}$), the motion controller module 285 selects a look-ahead point similar to the pure pursuit algorithm and calculates the bearing angle from its current location (x, y) to the look-ahead point:

$$\theta_{ref} = a\tan 2(x - y_l, y - y_l) \quad (14)$$

where $x_l$ and y correspond to the x-y coordinate of the look-ahead point. It is assumed that each vehicle has an initial desired velocity of $v_0$ and never drives faster than that. The motion controller module 285 uses the weight of the next edge to determine the reference velocity $$\left(v_{ref} = \frac{d_i}{w_i}\right).$$

If the calculated velocity is greater than the initial desired velocity ($v_0$) of the ego CAV 102A, the motion controller module 285 sets the reference velocity to be $v_0$. If the reference velocity is close to zero, ($v < \epsilon$), it is set to zero. Once the reference heading and velocity are calculated, they are passed to two Proportional Integral Derivative (PID) controllers to calculate a steering angle and acceleration for the ego CAV 102A:

$$\begin{cases} \psi = kp e_\theta + k_I \int e_\theta + k_D \dot{e}_\theta \\ a = k'_p e_v + k'_I \int e_v + k'_D \dot{e}_v \end{cases} \quad (15)$$

where $k_P$, $k_I$, $k_D$ and $k'_P$, $k'_I$, $k'_D$ are constant (controller gains) that are tuned to achieve a fast response while the overshoot is small (short settling time), $e_\theta = \theta_r - \theta$ and $e_v = v_{SAFE} - v$, and $e_v$ and $e_\theta$ are the derivative of $e_v$ and $e_\theta$, respectively.

Deadlock Detection and Resolution

Figure 8:
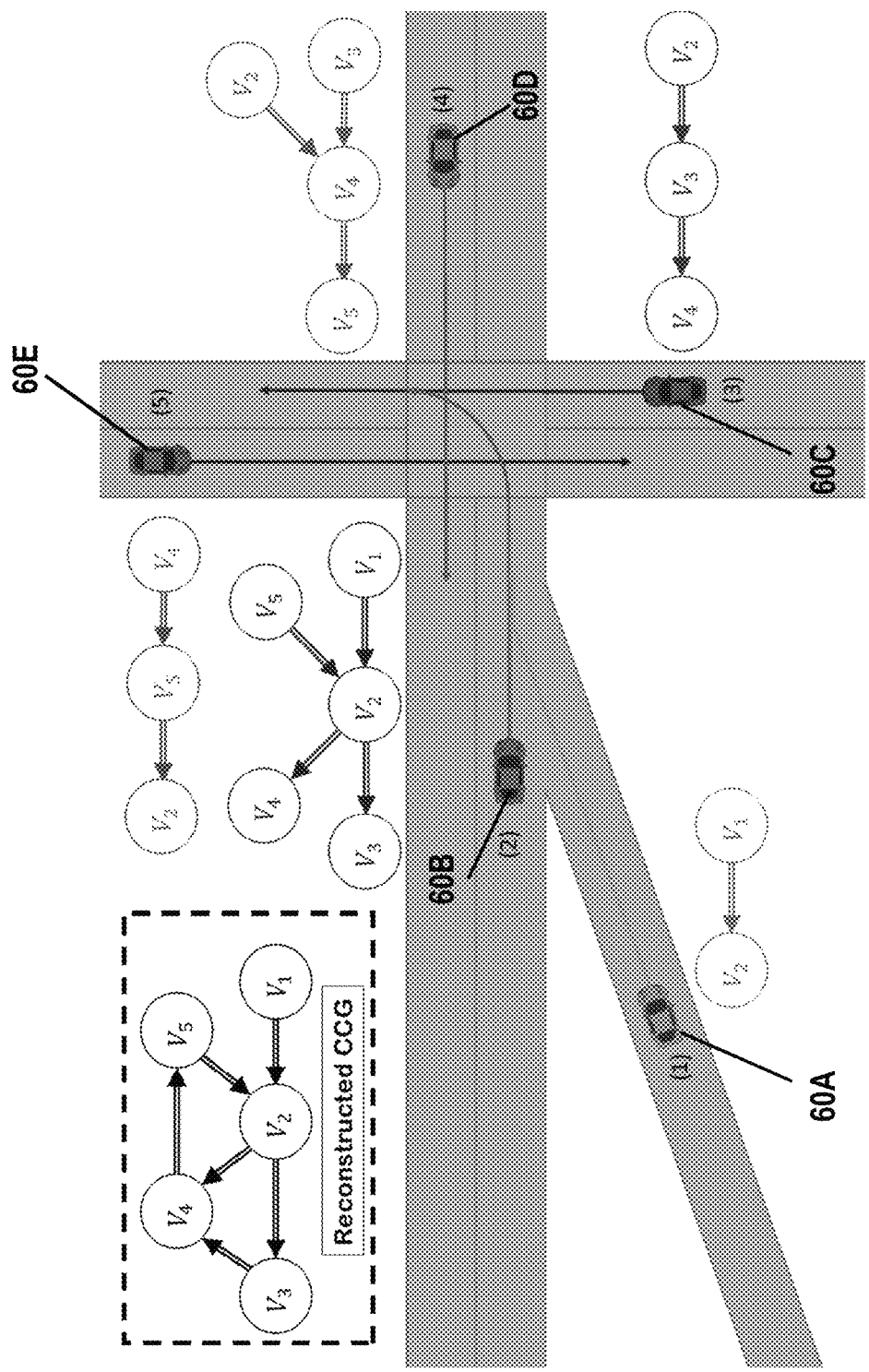
FIG. 8 is a simplified illustration showing that each CAV determines and broadcasts its Partial Dependency Graph (PDG)

In order to detect and resolve deadlocks, all CAVs 102 create a directed graph called the dependency graph. Nodes of the dependency graph are vehicle IDs, and edges of the dependency graph indicate if a CAV 102 is yielding to another CAV 102 over a conflict zone. There will be a directed edge from node $V_i$ to node $V_j$ if CAV $V_i$ is yielding to the CAV $V_j$ over a conflict zone. Since the ego CAV 102A determines only the conflicts between itself and other additional CAVs 102B-102N—and not the conflicts between other additional CAVs 102B-102N, the constructed dependency graph that the ego CAV 102A creates is not complete. The dependency graph of the ego CAV 102A is referred to as the "partial dependency graph" or PDG. To compute the complete graph, the ego CAV 102A broadcasts its PDG to inform the additional CAVs 102B-102N about its conflict zones with the additional CAVs 102B-102N and to receive PDGs from each of the additional CAVs 102B-102N (which are calculated by each respective additional CAVs 102B-102N from their own perspectives as "ego" CAVs). From the received PDGs of additional CAVs 102B-102N and the PDG of the ego CAV 102A, the complete dependency graph (CDG) is constructed. To build the CDG, the PDG stored by the ego CAV 102A is incrementally updated by adding nodes and edges for each received PDG. Finally, all edges between two nodes are merged into one. FIG. 8 shows a scenario with 5 CAVs 60A-60E that have each determined their own PDGs and the final consensual CDG.

After constructing the CDG, the ego CAV 102A checks if the CDG has a cycle. A Depth-First Search (DFS) algorithm is used to detect cycles. If a deadlock is detected, the ego CAV 102A calculates a score for each CAV 102 that is involved in the cycle based on its average time of arrival at corresponding conflict zones. If an ego CAV 102A has m conflicts, its score is calculated as:

$$S = \frac{\sum_{i=1}^{m} TOA_i}{m}$$

where $TOA_i$ is the time of arrival of the ego CAV 102A at its $i^{th}$ conflict zone. The CAV system 100 selects a CAV 102A, 102B, ... or 102N of the plurality of CAVs 102 with the least average time of arrival to have the advantage over all of its conflict zones because on average, it can reach its conflict zone earlier than others. This CAV 102A, 102B, ... or 102N, which may or may not be the ego CAV 102A, is referred to as the leader. Once the leader is determined, the direction of all incoming edges to the leader's node is reversed. If multiple CAVs 102 have the same score, a CAV 102A, 102B, ... or 102N with the lower ID number will be selected as the leader. Since there can be more than one cycle in a graph, this process is iteratively repeated until all cycles are removed. The leader changes each time this is process is repeated (as the last leader has already left the conflict zone and is no longer considered to be a deadlocked CAV). Each time a leader CAV moves forward past the conflict zone, scores are calculated again for the remaining deadlocked CAVs and a new leader CAV is chosen.

LEMMA 5.1. If the CDG has no cycles, then there is no deadlock involving the ego CAV.

PROOF. Once the CDG is modified to be acyclic, there is no path (set of sequential edges) starting at node $v_{ego}$ that eventually loops back to node $v_{ego}$ again, which means the ego CAV 102A never yields to other CAVs 102B-102N that are yielding to the ego CAV 102A and therefore, there is no deadlock involving the ego CAV 102A.

It takes some time to resolve a deadlock due to the vehicle's dynamic—CAVs 102 cannot change their velocity and expected arrival time instantly. As a result, CAVs 102 may face the same deadline again when they compute the CDG after T. It can be shown that the result of deadlock resolution will be the same (the same CAV 102A, 102B, ... or 102N will be selected as the leader) until the deadlock is resolved. Since the leader CAV 102A, 102B, ... or 102N has the least average time of arrival in the first iteration, it does not yield to any other CAV 102 while other CAVs 102 involved in the deadlock slow down to yield to at least one CAV 102. Therefore, the average time of arrival of the leader CAV 102A, 102B, ... or 102N will be less than other CAVs 102 in the second iteration and so on.

Experimental Results

Figure 9A:
FIG. 9A is a snapshot of a map retrieved from an OpenStreetMap application.
Figure 9B:
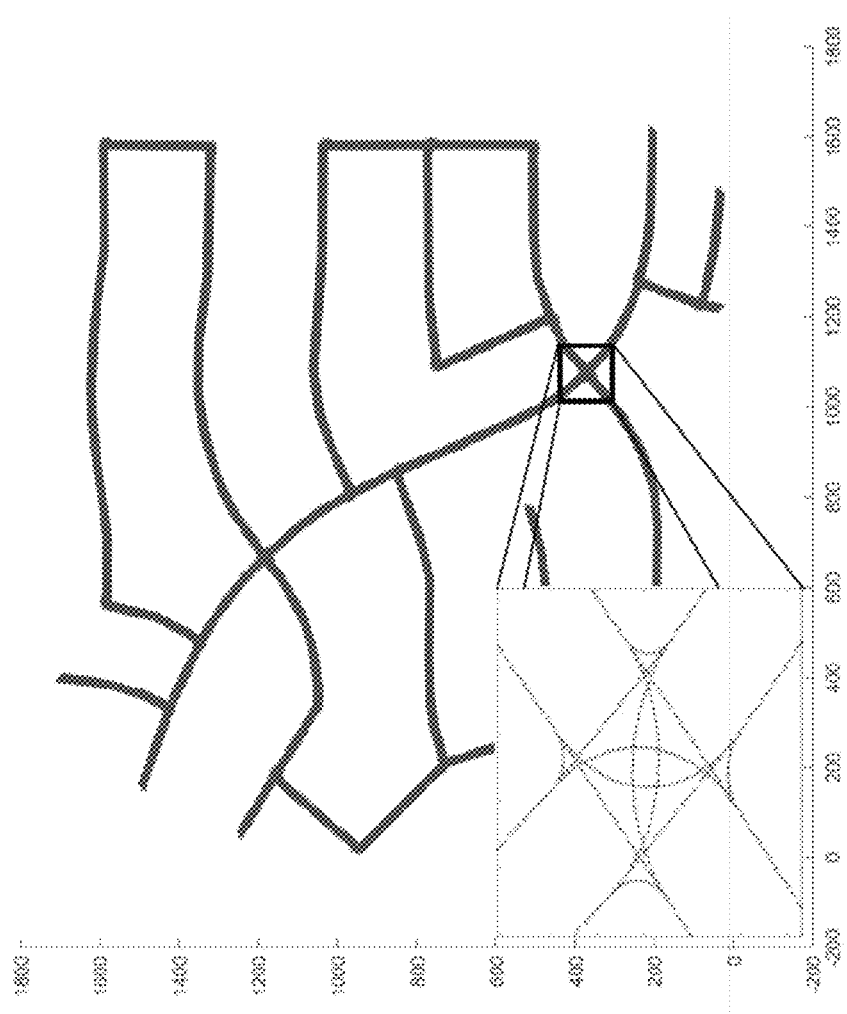
FIG. 9B is a corresponding directed graph in MATLAB.
Figure 9C:
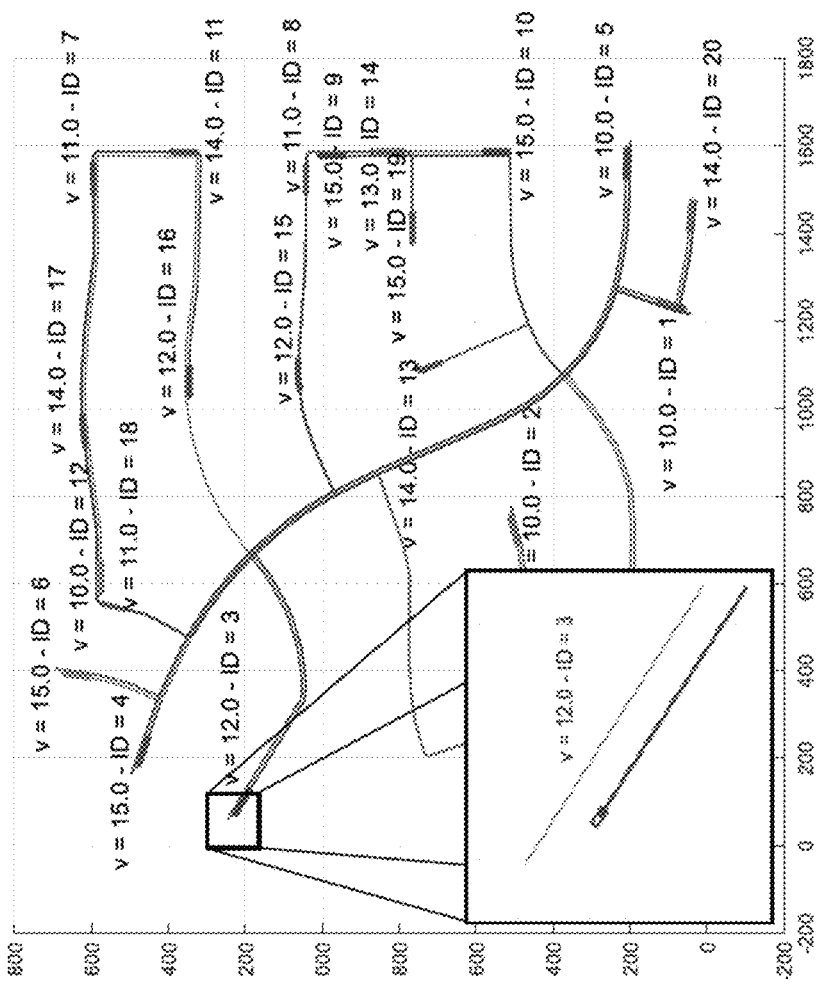
FIG. 9C is a map showing a scenario with randomly spawned vehicles on the map.

The algorithm was evaluated on a simulator that was developed in Matlab. The tool was created in Python to automatically extract a desired map from the OpenStreet-Map (OSM format) and then generate the world map graph for it. Once the map was generated, a driving scenario was created where initial position and velocity and the destination of CAVs are randomly selected. The CAV system used differential equations represented in (1) to model vehicle's dynamics. The size of each vehicle is 5×2 meters, the lane width is 5 meters and the distance between waypoints of the map is 0.5 meters. Gains of the controller for both heading and velocity control are $K_P=5$ and $K_D=0.1$. Other parameters of the vehicle are listed in Table 1. CAVs communication delay is modeled by queuing the broadcast packets. In FIGS. 9A-9C, a randomly generated map from openStreet-Map, its corresponding map graph and a random scenario with 20 CAVs are depicted.

TABLE 1

Parameters of the CAVs for simulation.

| $v_{min}$ | $v_{max}$ | $a_{min}$ | $a_{max}$ | $\psi_{min}$ | $\psi_{max}$ | T | ρ |
|---|---|---|---|---|---|---|---|
| 0 m/s | 23 m/s | −8 m/s² | 5 m/s² | −π/3 rad | π/3 rad | 0.1 s | 0.2 s |

Safety Evaluation

Figure 10A:
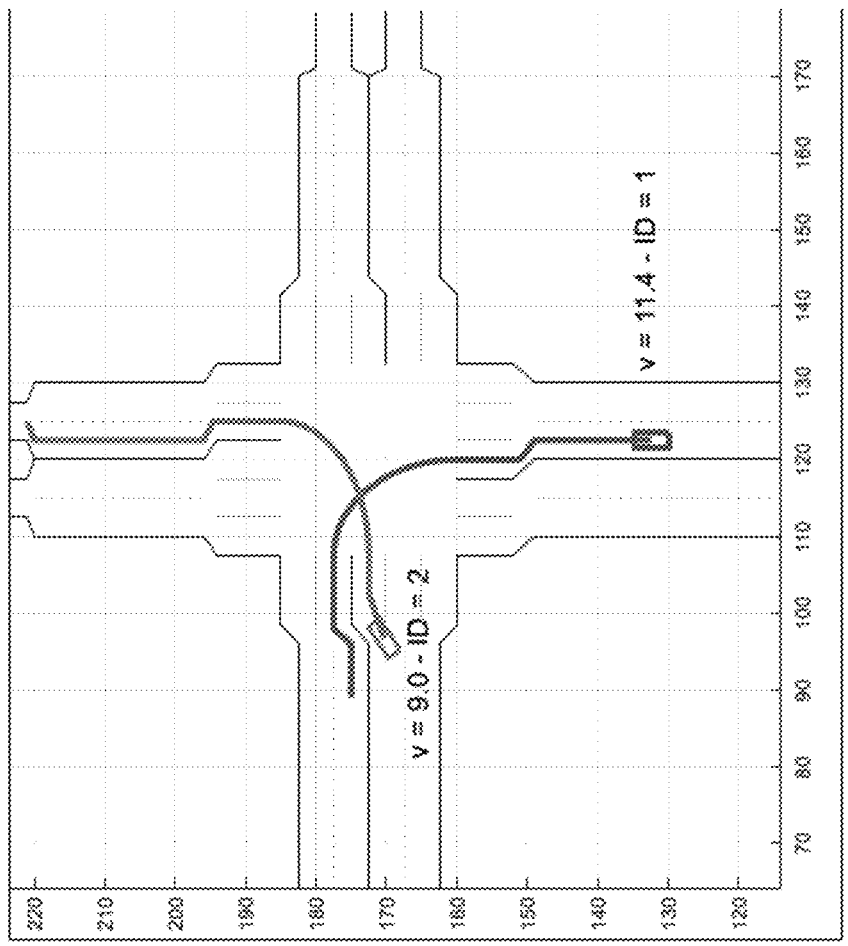
FIGS. 10A and 10B show an intersection scenario and a merge scenario.
Figure 10B:
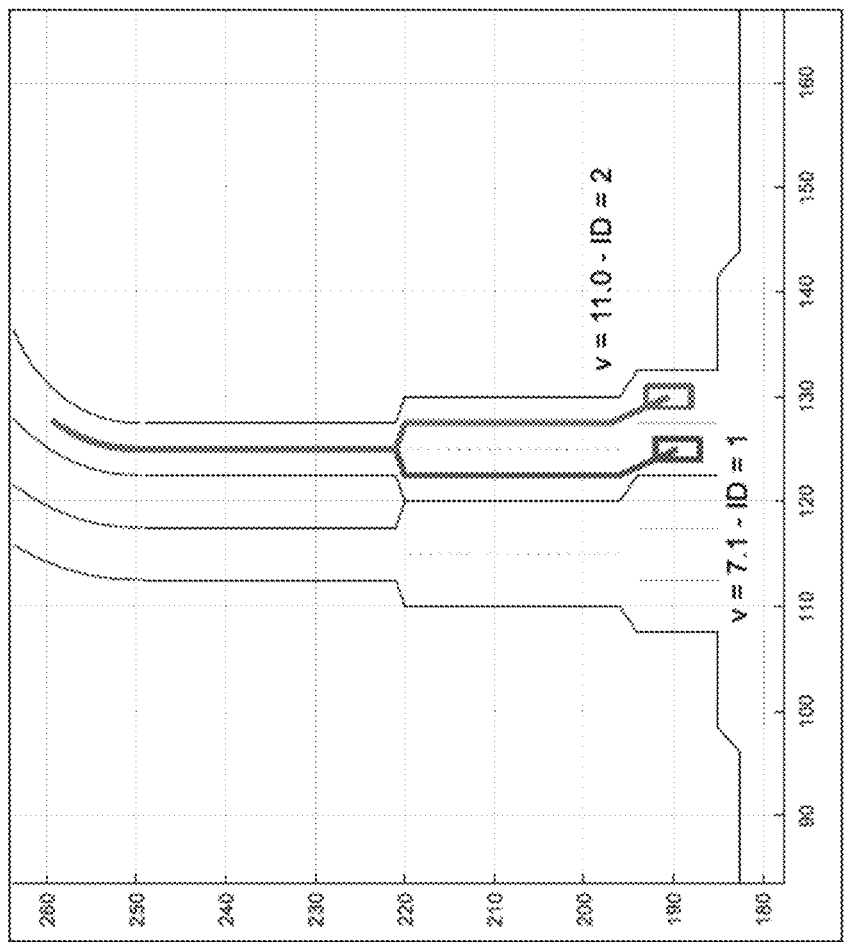

To demonstrate the safety of the proposed algorithm, a merge and an intersection scenario was created where two CAVs have a conflict on their future path as it is depicted in FIGS. 10A and 10B.

Figure 11:
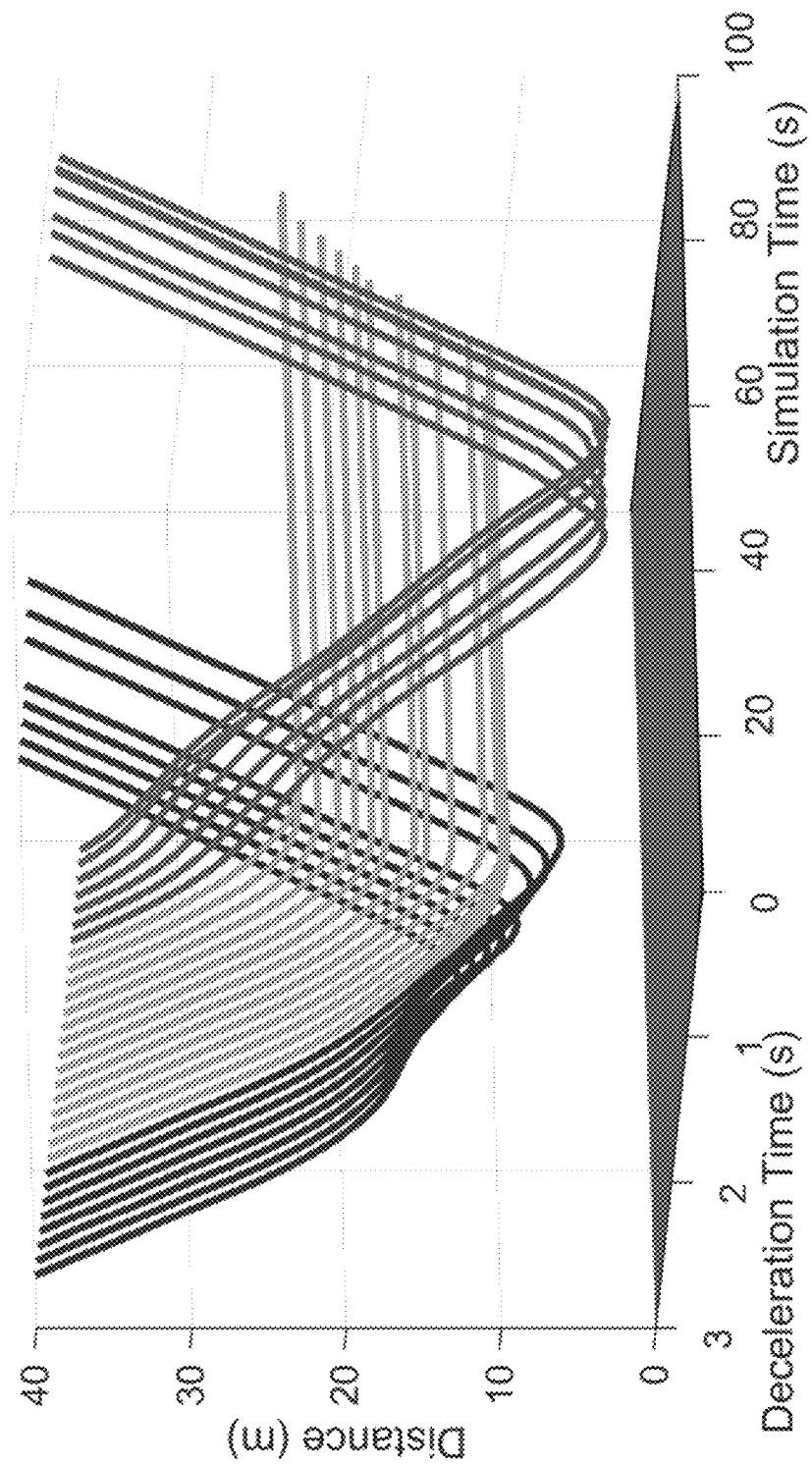
FIG. 11 is a graphical representation showing brute-force evaluation of an intersection scenario in which the CAVs distance is always greater than a threshold regardless of the deceleration time of the CAV with the advantage.
Figure 12:
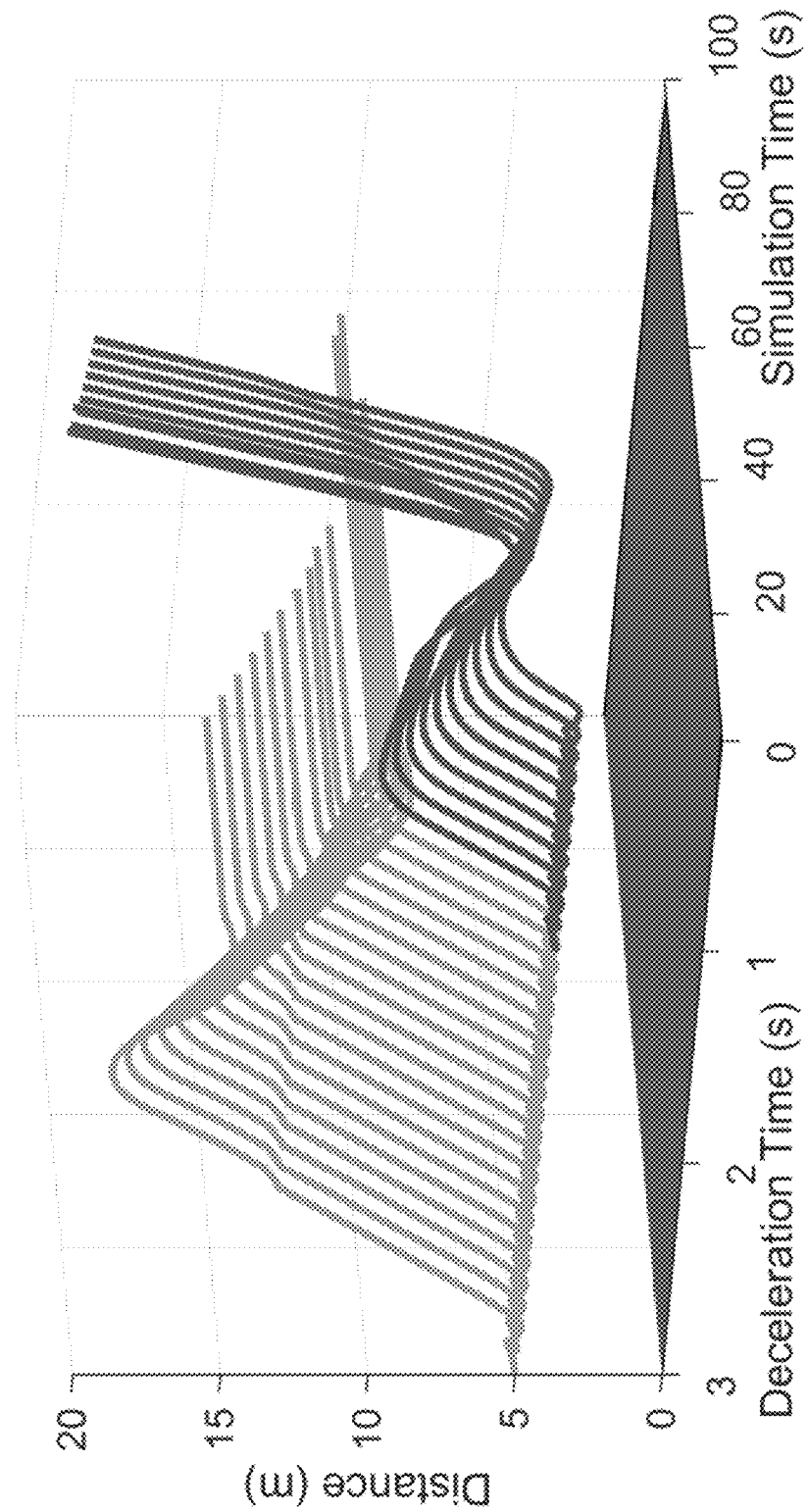
FIG. 12 is a graphical representation showing a merging scenario in which the CAVs distance remains greater than a threshold for all cases where the CAV with advantage stops before entering the merge (yellow) or after the merge (dark green)

To verify that CAVs are always safe, the CAV with the advantage was forced to suddenly decelerate at different times. It was shown that no accident will happen regardless of the deceleration time and CAVs maintain a minimum safe distance of 5 meters. Using brute-force testing, the deceleration time of the CAV with the advantage varies in a 30-second interval with a 0.1 second increment that includes critical times that stops inside the conflict zone. FIGS. 11 and 12 show the distance between CAVs for the intersection and merge scenarios, respectively. In the intersection scenario, the CAV with the advantage may stop before, inside, or after the conflict zone where distances between CAVs are depicted in dark green, yellow, and blue colors, respectively. For cases that the CAV with advantage stops before or after the conflict zone, the CAV with disadvantage continues while in cases that the CAV with advantage stops inside the conflict zone, the CAV with advantage slows down and stops (depicted in yellow). In the merge scenario, the conflict zone moves with the CAV with the advantage after it reaches the merging point. As a result, the CAV with the advantage either stops before the conflict zone or inside it. For cases that the CAV with the advantage stops before the merging point, the CAV with the advantage continues and enters the merge (depicted in dark green) and for the rest of the cases, the CAV with the disadvantage slows down and stops (depicted in yellow).

Deadlock Resolution Demonstration

Figures 13A, 13B:
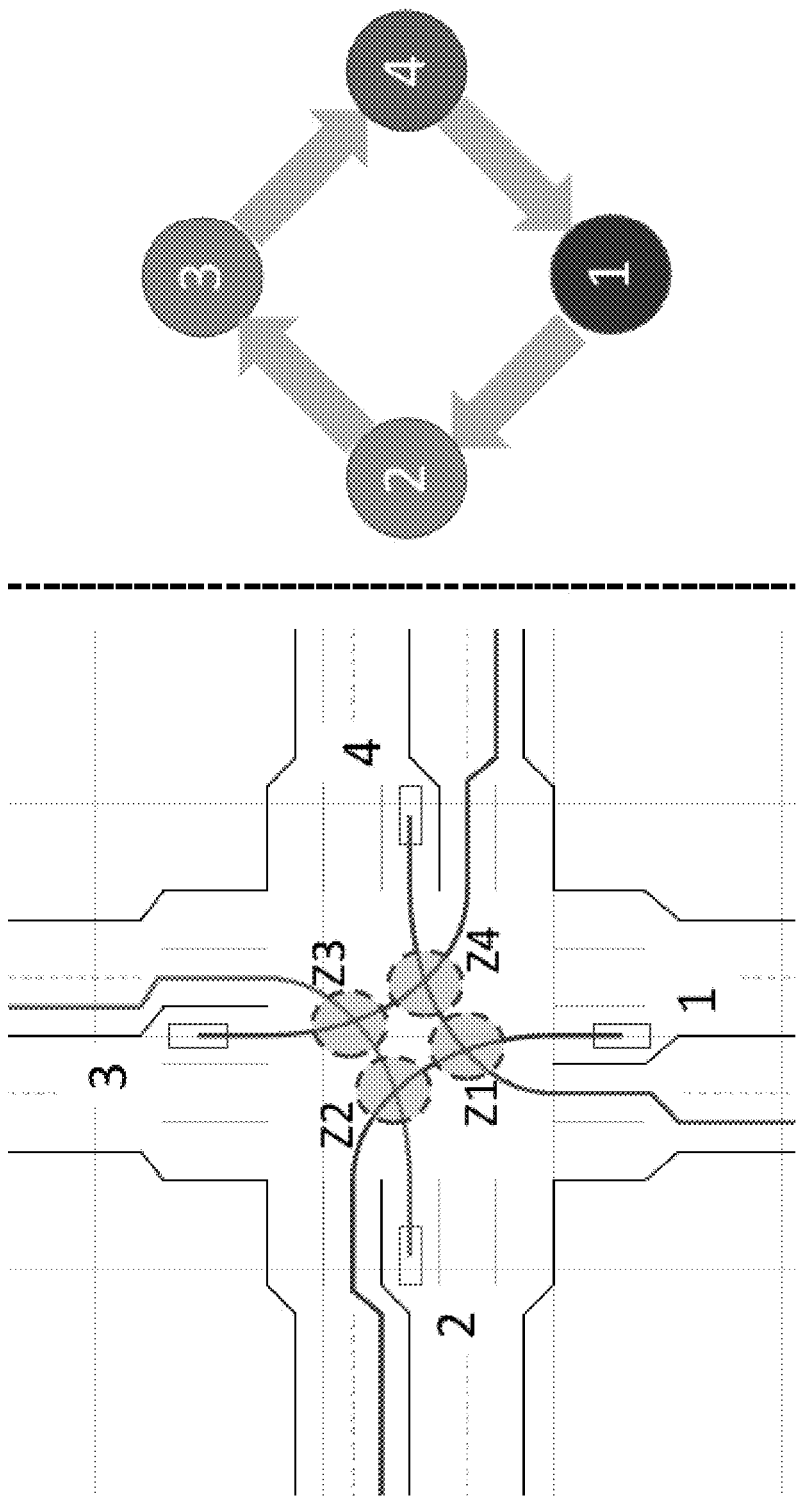
FIG. 13A is an illustration that shows a deadlock scenario where four CAVs approach at the intersection at the same velocity and FIG. 13B is the corresponding Complete Dependency Graph (CDG)
Figure 14:
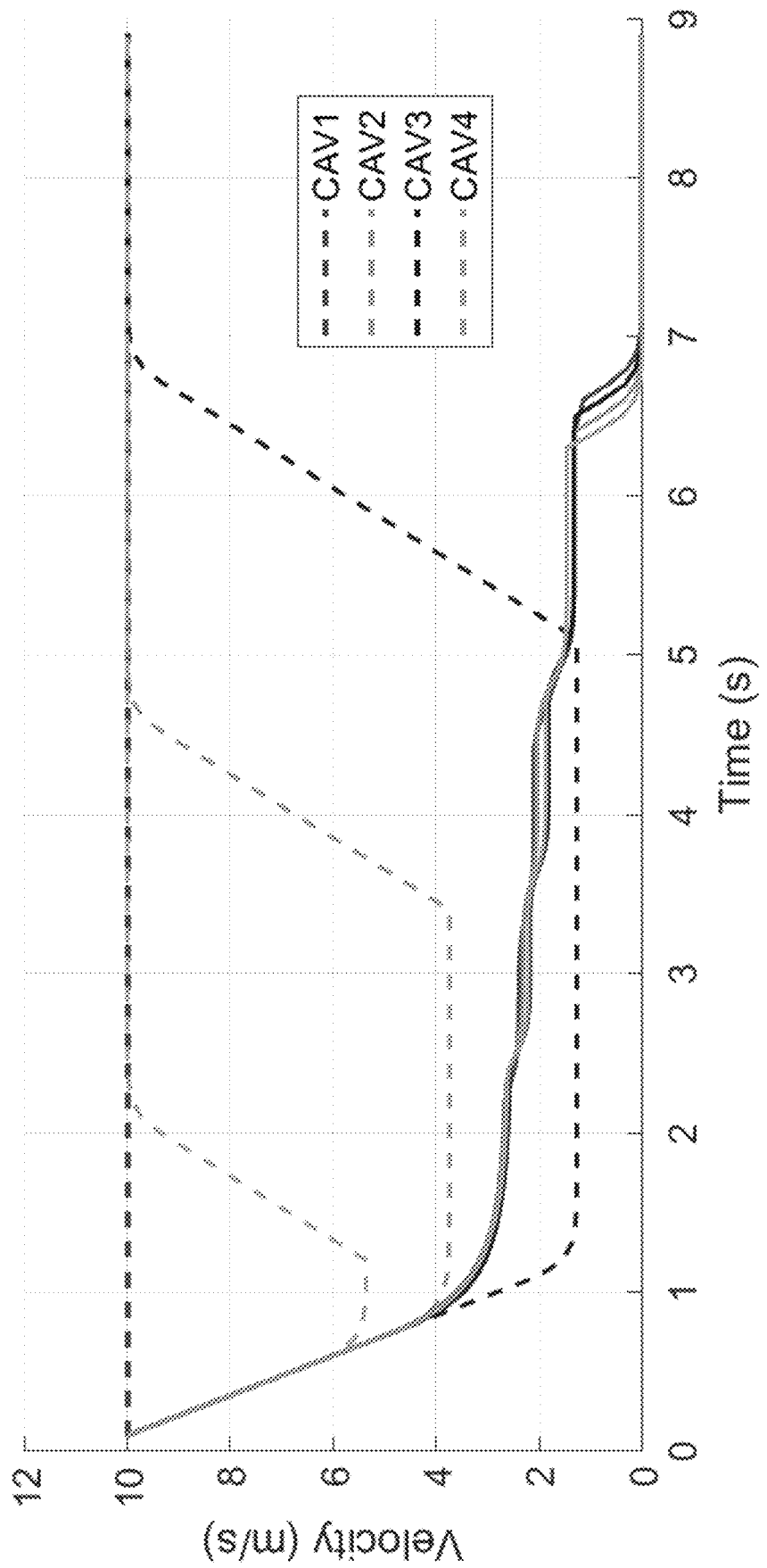
FIG. 14 is a graphical representation showing velocity profiles of CAVs with and without deadlock resolution for the scenario shown in FIGS. 13A and 13B.

To evaluate the deadlock detection and resolution approach, a deadlock situation at the intersection (FIG. 13A) was created. FIG. 13B shows the CCG for the scenario. The paths of CAVs were fixed to make a left turn at the intersection while having the same distance from the intersection and the same velocity. The CAVs' behavior were simulated both with and without deadlock detection. FIG. 14 shows the velocities of CAVs for both cases. For the case that no deadlock resolution is done, CAVs slow down to yield to other CAVs and eventually stop and will wait forever. For the case with deadlock resolution, CAVs slow down at first but speed up when their conflict zone is cleared. It was observed that after 7 seconds, all CAVs reach their desired velocity (10 m/s) while in no deadlock detection case, their velocity converges to zero.

Efficiency Evaluation

To evaluate the efficiency of the CAV system, the performance of the CAV system was compared with the case that vehicles are autonomous but not connected. For the non-connected case, the intersections are managed by stop signs and all other conflicts among CAVs are handled by the AV's perception system e.g. adaptive cruise control (ACC) system. A map was extracted from the OpenStreetMap (FIGS. 9A-9C) and simulated three scenarios, i) light traffic with 5 vehicles, ii) moderate traffic with 10 vehicles, and iii) heavy traffic with 20 vehicles being present at the same time. When a vehicle exits the map boundary, a new vehicle is spawned. The average velocities of CAVs were measured and reported them in Table 2. The fuel consumption of CAVs was also computed using the following model and reported them in Table 2:

$$f = \begin{cases} 0 & \text{if } P_T > 0 \\ \dfrac{f_i}{3600} + \beta_1 P_T + \beta_2 a P_I & \text{otherwise} \end{cases} \quad (16)$$

Where $P_T=\min(P\max, P_C+P_I)$ is the total tractive power (kW), $PC=b_1v+b_2v^3$ is the cruise component of total power (kW), $$P_C = b_1 v + b_2 v^3$$

if the cruise component of total power (kW), $$P_I = \frac{mav}{1000}$$

is the inertia component of the total power (kW), $f_i=888.8$ mL/h is the instantaneous fuel consumption rate (mL/s), P max is the maximum engine power (kW), m is the vehicle mass, a and v are the instantaneous acceleration and velocity, b1 is rolling resistant factor (kN), and b2 is the aerodynamic drag factor (kN/(m/s)²), β1 and β2 are the efficiency factors for non-accelerating and accelerating cases.

TABLE 2

Comparing the average velocity and fuel consumption of vehicles when they navigate autonomously (non-connected) and cooperatively (connected).

| | Light Traffic | | Moderate Traffic | | Heavy Traffic | |
|---|---|---|---|---|---|---|
| | AVs | CAVs | AVs | CAVs | AVs | CAVs |
| Average Velocity (m/s) | 10.51 | 11.55 | 10.91 | 11.83 | 11.21 | 11.96 |
| Average Fuel Consumption (mL/s) | 1.271 | 0.495 | 1.089 | 0.479 | 1.017 | 0.485 |

With the help of shared information, CAVs not only drive at higher velocities, they drive smoother than non-connected case because they slow down and stop less frequently and therefore, their fuel consumption is less than the connected case.

Computing System

Figure 15:
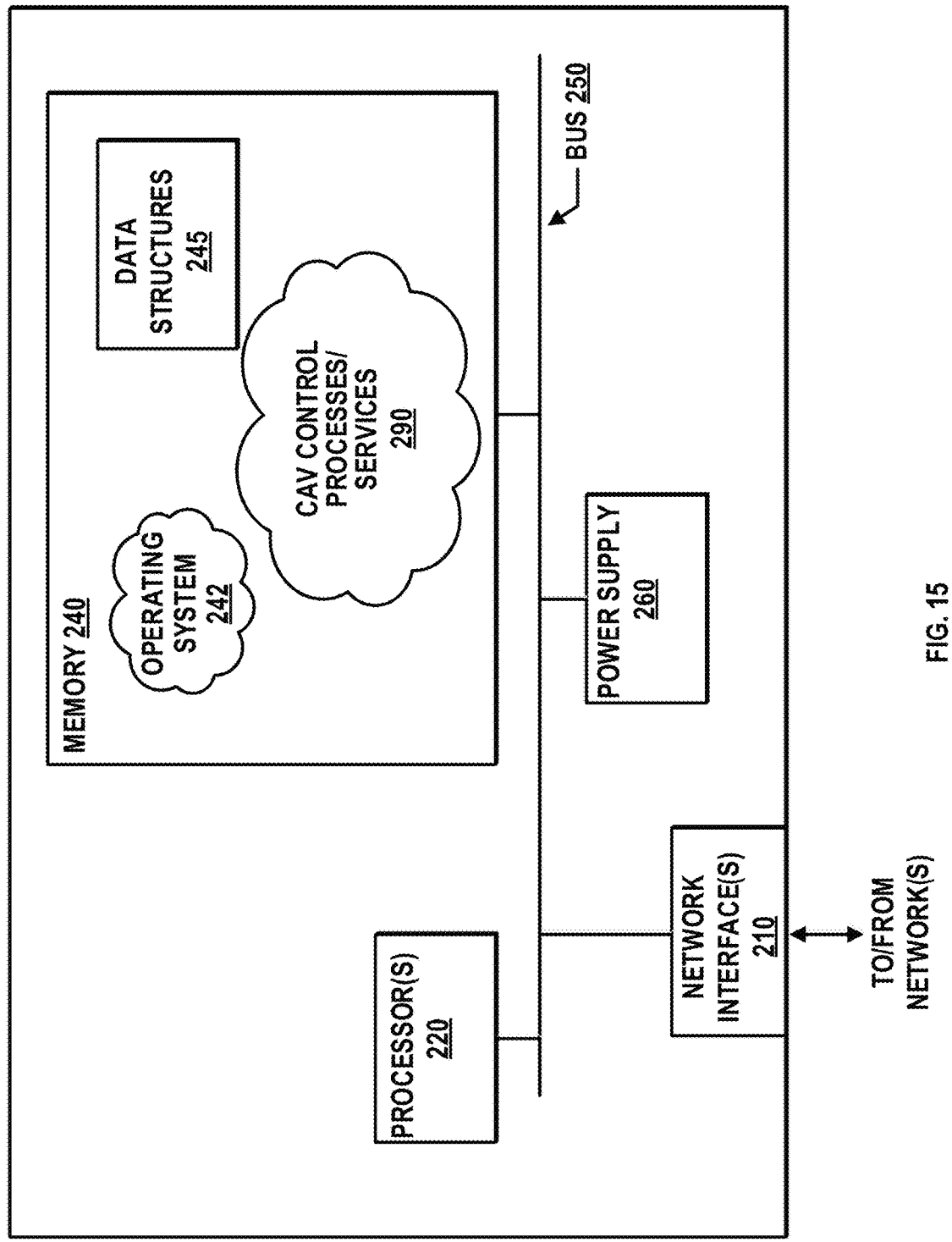
FIG. 15 is a simplified block diagram showing an example computing device for use with the CAV system.

FIG. 15 is a schematic block diagram of an example device 200 that may be used with one or more embodiments described herein, e.g., as a component of CAV system 100 and/or as computing system 200 shown in FIG. 4A.

Device 200 comprises one or more network interfaces 210 (e.g., wireless, PLC, etc.), at least one processor 220, and the memory 240 interconnected by a system bus 250, as well as a power supply 260 (e.g., battery, plug-in, etc.).

Network interface(s) 210 include the mechanical, electrical, and signaling circuitry for communicating data over the communication links coupled to a communication network. Network interfaces 210 are configured to transmit and/or receive data using a variety of different communication protocols. As illustrated, the box representing network interfaces 210 is shown for simplicity, and it is appreciated that such interfaces may represent different types of network connections such as wireless and wired (physical) connections. Network interfaces 210 are shown separately from power supply 260, however it is appreciated that the interfaces that support PLC protocols may communicate through power supply 260 and/or may be an integral component coupled to power supply 260.

Memory 240 includes a plurality of storage locations that are addressable by processor 220 and network interfaces 210 for storing software programs and data structures associated with the embodiments described herein. In some embodiments, device 200 may have limited memory or no memory (e.g., no memory for storage other than for programs/processes operating on the device and associated caches).

Processor 220 comprises hardware elements or logic adapted to execute the software programs (e.g., instructions) and manipulate data structures 245. An operating system 242, portions of which are typically resident in memory 240 and executed by the processor, functionally organizes device 200 by, inter alia, invoking operations in support of software processes and/or services executing on the device. These software processes and/or services may include CAV Control processes/services 290 described herein which can include the various modules stored in memory 240 and illustrated in FIGS. 4A and 4B including CAV info module 270, future path module 272, conflict zone detection module 274, deadlock detection and resolution module 278, CDG construction module 276, motion planner module 280 and motion controller module 285. Note that while CAV Control processes/services 290 is illustrated in centralized memory 240, alternative embodiments provide for the process to be operated within the network interfaces 210, such as a component of a MAC layer, and/or as part of a distributed computing network environment.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules or engines configured to operate in accordance with the techniques herein (e.g., according to the functionality of a similar process). In this context, the term module and engine may be interchangeable. In general, the term module or engine refers to model or an organization of interrelated software components/functions. Further, while the CAV Control processes/services 290 is shown as a standalone process, those skilled in the art will appreciate that this process may be executed as a routine or module within other processes.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. An ego connected autonomous vehicle (CAV), comprising:
   a processor in communication with a memory, the memory including instructions, which, when executed, cause the processor to:
     determine a planned future path of the ego CAV of a plurality of connected autonomous vehicles (CAVs) based on a known starting location and a known destination location relative to a world map;
     exchange, through a network interface in association with the memory of the ego CAV, a set of ego CAV information including the planned future path of the ego CAV with one or more additional CAVs of the plurality of CAVs, wherein a set of additional CAV information received at the ego CAV from a respective additional CAV of the one or more additional CAVs includes a planned future path of the additional CAV;
     exchange, through the network interface, one or more partial dependency graphs, wherein a partial dependency graph of the one or more partial dependency graphs is maintained by the ego CAV and is associated with the one or more additional CAVs, wherein the partial dependency graph is indicative of one or more conflict zones that exist on the world map between the planned future path of the ego CAV and the planned future paths of the one or more additional CAVs of the plurality of CAVs;
     construct, at the ego CAV, a complete dependency graph based on the one or more partial dependency graphs computed by the ego CAV and one or more partial dependency graphs received from each respective additional CAV of the one or more additional CAVs of the plurality of CAVs;
     iteratively resolve, at the ego CAV, one or more deadlocks identified within the complete dependency graph; and
     apply an updated future path to a motion controller of the ego CAV based on the complete dependency graph.

2. The ego CAV of claim 1, further comprising:
   a throttle in communication with the motion controller and operable to control an acceleration of the CAV based on one or more electrical inputs;
   a braking mechanism in communication with the motion controller and operable to control a deceleration of the CAV based on one or more electrical inputs; and
   a steering mechanism in communication with the motion controller and operable to control a trajectory of the CAV based on one or more electrical inputs.

3. The ego CAV of claim 2, wherein the memory further includes instructions, which, when executed, cause the processor to:
   provide, by the motion controller of the ego CAV, one or more electrical inputs to the throttle, the braking mechanism, or the steering mechanism of the first CAV based on the updated future path of the ego CAV.

4. The ego CAV of claim 1, wherein the memory further includes instructions, which, when executed, cause the processor to:
   broadcast the set of ego CAV information about the ego CAV to the one or more additional CAVs of the plurality of CAVs, wherein the set of ego CAV information includes: an instant x position of the ego CAV, an instant y position of the ego CAV, an instant velocity of the ego CAV, an instant timestamp of the ego CAV, the planned future path of the ego CAV, and an ego CAV identifier; and receive, at the ego CAV, the set of additional CAV information about the additional CAV of the one or more additional CAVs of the plurality of CAVs, wherein the set of additional CAV information includes: an instant x position of the additional CAV, an instant y position of the additional CAV, an instant velocity of the additional CAV, an instant timestamp of the additional CAV, the planned future path of the additional CAV, and an additional CAV identifier.

5. The ego CAV of claim 1, wherein the memory further includes instructions, which, when executed, cause the processor to:

identify, using the set of ego CAV information and the set of additional CAV information, the one or more conflict zones where the planned future path of the ego CAV and the planned future path of the additional CAV are expected to intersect;

compute, at the ego CAV, the partial dependency graph associated with the additional CAV of the one or more CAVs based on the one or more conflict zones associated with the additional CAV of the one or more CAVs; and broadcast, through the network interface, the partial dependency graph to the associated additional CAV of the one or more additional CAVs of the plurality of CAVs.

6. The ego CAV of claim 5, wherein the partial dependency graph includes a plurality of nodes connected by one or more edges:

wherein a first node of the plurality of nodes of the partial dependency graph is indicative of the ego CAV and wherein a second node of the plurality of nodes is indicative of the additional CAV of the one or more additional CAVs; and wherein an edge between the first node and the second node of the plurality of nodes of the partial dependency graph is indicative of a conflict zone of the one or more conflict zones;

wherein an incoming direction of an edge to the first node is indicative of a yielding dependency between the ego CAV and the additional CAV such that the ego CAV is expected to yield to the additional CAV at the conflict zone; and wherein an incoming edge to the second node is indicative of a yielding dependency between the ego CAV and the additional CAV such that the additional CAV is expected to yield to the ego CAV at the conflict zone.

7. The ego CAV of claim 1, wherein the memory further includes instructions, which, when executed, cause the processor to:

receive, through the network interface of the ego CAV, one or more partial dependency graphs from each respective additional CAV of the one or more additional CAVs of the plurality of CAVs.

8. The ego CAV of claim 1, wherein the memory further includes instructions, which, when executed, cause the processor to:

iteratively update the partial dependency graph maintained by the ego CAV by addition of a plurality of nodes and one or more edges present in each partial dependency graph received from each respective additional CAV of the one or more additional CAVs to the partial dependency graph maintained by the ego CAV; and merging the one or more edges present in the updated partial dependency graph maintained by the ego CAV resulting in the complete dependency graph.

9. The ego CAV of claim 1, wherein the memory further includes instructions, which, when executed, cause the processor to:

identify, at the ego CAV, the one or more deadlocks within the complete dependency graph, wherein a deadlock of the one or more deadlocks is defined as a cycle within the complete dependency graph associated with:
a conflict zone of the one or more conflict zones of the world map; and
a plurality of deadlocked CAVs of the plurality of CAVs that are deadlocked at the conflict zone.

10. The ego CAV of claim 9, wherein the memory further includes instructions, which, when executed, cause the processor to:

calculate, at the ego CAV, a score for each respective deadlocked CAV of the plurality of deadlocked CAVs involved in the deadlock of the one or more deadlocks based on an average time of arrival at the conflict zone of each respective deadlocked CAV of the plurality of deadlocked CAVs as indicated within the complete dependency graph;

appoint a leader CAV of the plurality of deadlocked CAVs based on the score, wherein a node of the plurality of nodes of the complete dependency graph that is associated with the leader CAV is appointed as a leader node; and reverse a direction of one or more incoming edges of the complete dependency graph to the leader node of the plurality of nodes of the complete dependency graph such that each deadlocked CAV of the plurality of deadlocked CAVs excluding the leader CAV is expected to yield to the leader CAV at the conflict zone.

11. The ego CAV of claim 1, wherein the memory further includes instructions, which, when executed, cause the processor to:

update the planned future path of the ego CAV based on the one or more deadlocks identified within the complete dependency graph resulting in the updated future path of the ego CAV.

12. The ego CAV of claim 11, wherein the memory further includes instructions, which, when executed, cause the processor to select an updated future path that avoids one or more conflict zones identified within the complete dependency graph.

13. The ego CAV of claim 1, wherein the memory further includes instructions, which, when executed, cause the processor to:

determine a safe velocity to be maintained by the ego CAV based on a minimum safe distance that the ego CAV must maintain from a conflict zone of the one or more conflict zones.

14. The ego CAV of claim 1, wherein the memory further includes instructions, which, when executed, cause the processor to:

update one or more weights of the world map to account for a presence of the one or more additional CAVs.

15. A method, comprising:

determining, by a processor in communication with a memory of an ego connected autonomous vehicle (CAV) of a plurality of connected autonomous vehicles (CAVs), a planned future path of the ego CAV based on a known starting location and a known destination location relative to a world map;

exchanging, through a network interface in association with the memory of the ego CAV, a set of ego CAV information including the planned future path of the ego CAV with one or more additional CAVs of the plurality of CAVs, wherein a set of additional CAV information received at the ego CAV from a respective additional CAV of the one or more additional CAVs includes a planned future path of the additional CAV;

exchanging, through the network interface, one or more partial dependency graphs, wherein a partial dependency graph of the one or more partial dependency graphs is maintained by the ego CAV and is associated with the one or more additional CAVs of the plurality of CAVs, wherein the partial dependency graph is indicative of one or more conflict zones that exist on the world map between the planned future path of the ego CAV and the planned future paths of the one or more additional CAVs of the plurality of CAVs;

constructing, at the ego CAV, a complete dependency graph based on the one or more partial dependency graphs maintained by the ego CAV and the one or more partial dependency graphs received from each respective additional CAV of the one or more additional CAVs of the plurality of CAVs;

iteratively resolving, at the ego CAV, one or more deadlocks identified within the complete dependency graph; and applying an updated future path to a motion controller of the ego CAV based on the complete dependency graph.

16. The method of claim 15, further comprising:
providing, by the motion controller of the ego CAV, one or more electrical inputs to a throttle, a braking mechanism, or a steering mechanism of the first CAV based on the updated future path of the ego CAV.

17. The method of claim 15, wherein the step of exchanging one or more partial dependency graphs further comprises:
identifying, using the set of ego CAV information and the set of additional CAV information, the one or more conflict zones where the planned future path of the ego CAV and the planned future path of the additional CAV are expected to intersect;
computing, at the ego CAV, the partial dependency graph associated with the additional CAV of the one or more CAVs based on the one or more conflict zones associated with the additional CAV of the one or more CAVs; and
broadcasting, through the network interface, the partial dependency graph to the associated additional CAV of the one or more additional CAVs.

18. The method of claim 15, wherein the step of exchanging one or more partial dependency graphs further comprises:
receiving, through the network interface of the ego CAV, one or more partial dependency graphs from each respective additional CAV of the one or more additional CAVs of the plurality of CAVs.

19. The method of claim 15, wherein the step of iteratively resolving one or more deadlocks identified within the complete dependency graph further comprises:
identifying, at the ego CAV, the one or more deadlocks within the complete dependency graph, wherein a deadlock of the one or more deadlocks is defined as a cycle within the complete dependency graph associated with:
a conflict zone of the one or more conflict zones of the world map; and
a plurality of deadlocked CAVs of the plurality of CAVs that are deadlocked at the conflict zone.

20. The method of claim 19, wherein the step of iteratively resolving one or more deadlocks identified within the complete dependency graph further comprises:
calculating, at the ego CAV, a score for each respective deadlocked CAV of the plurality of deadlocked CAVs involved in the deadlock of the one or more deadlocks based on an average time of arrival at the conflict zone of each respective deadlocked CAV of the plurality of deadlocked CAVs as indicated within the complete dependency graph;
appointing a leader CAV of the plurality of deadlocked CAVs based on the score, wherein a node of the plurality of nodes of the complete dependency graph that is associated with the leader CAV is appointed as a leader node; and
reversing a direction of one or more incoming edges of the complete dependency graph to the leader node of the plurality of nodes of the complete dependency graph such that each deadlocked CAV of the plurality of deadlocked CAVs excluding the leader CAV is expected to yield to the leader CAV at the conflict zone.

21. The method of claim 15, wherein the step of iteratively resolving one or more deadlocks identified within the complete dependency graph further comprises:
updating the planned future path of the ego CAV based on the one or more deadlocks identified within the complete dependency graph resulting in the updated future path of the ego CAV.

* * * * *